(12) United States Patent
Mukunoki et al.

(10) Patent No.: US 8,414,803 B2
(45) Date of Patent: Apr. 9, 2013

(54) METHOD FOR PRODUCING TRANSPARENT POLYMER FILM, TRANSPARENT POLYMER FILM PRODUCED BY THE METHOD, RETARDATION FILM, POLARIZER, AND LIQUID-CRYSTAL DISPLAY DEVICE

(75) Inventors: Yasuo Mukunoki, Minami-ashigara (JP); Yasuyuki Sasada, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 503 days.

(21) Appl. No.: 12/181,748

(22) Filed: Jul. 29, 2008

(65) Prior Publication Data
US 2009/0032995 A1 Feb. 5, 2009

(30) Foreign Application Priority Data

Jul. 30, 2007 (JP) ................................. 2007-197214

(51) Int. Cl.
*B29C 71/02* (2006.01)

(52) U.S. Cl. ........ 264/1.34; 264/1.35; 264/1.6; 264/1.7; 264/2.6; 264/234; 264/235; 264/345; 264/346; 264/235.6; 264/235.8

(58) Field of Classification Search .................. 264/241, 264/345, 234, 235, 346, 1.34, 1.35, 1.6, 1.7, 264/2.6, 235.6, 235.8
See application file for complete search history.

(56) References Cited

U.S. PATENT DOCUMENTS

| 5,753,140 A | * | 5/1998 | Shigemura ............... 252/299.01 |
| 7,026,064 B1 | * | 4/2006 | Tsunekawa et al. ....... 428/847.4 |
| 2006/0008641 A1 | * | 1/2006 | Kiehne et al. ................. 428/328 |
| 2006/0127607 A1 | * | 6/2006 | Okubo et al. ................. 428/1.3 |
| 2006/0202366 A1 | * | 9/2006 | Murakami et al. ............. 264/1.7 |
| 2007/0275187 A1 | * | 11/2007 | Sasada ........................ 428/1.31 |
| 2010/0188619 A1 | * | 7/2010 | Otoshi et al. .................... 349/96 |

FOREIGN PATENT DOCUMENTS

| JP | 05-157911 A | 6/1993 |
| JP | 05-197073 A | 8/1993 |
| JP | 2000-231016 A | 8/2000 |
| JP | 2006-215142 A | 8/2006 |
| WO | WO 2006/129822 | * 12/2006 |

* cited by examiner

*Primary Examiner* — Christina Johnson
*Assistant Examiner* — Saeed Huda
(74) *Attorney, Agent, or Firm* — Buchanan Ingersoll & Rooney PC

(57) ABSTRACT

A method for producing a transparent polymer film, comprising heat-treating a polymer film containing a polymer and a plasticizer having a number-average molecular weight of from 500 to 10000 and having a repetitive unit, at a temperature T (unit, ° C.) satisfying the following formula (1):

$$Tc \leq T < Tm_0 \qquad (1)$$

wherein Tc means the crystallization temperature of the polymer film and $Tm_0$ means the melting point of the polymer film.

5 Claims, No Drawings

METHOD FOR PRODUCING TRANSPARENT POLYMER FILM, TRANSPARENT POLYMER FILM PRODUCED BY THE METHOD, RETARDATION FILM, POLARIZER, AND LIQUID-CRYSTAL DISPLAY DEVICE

BACKGROUND OF THE INVENTION

1. Field of the Invention

The present invention relates to a method for producing a transparent polymer film. More precisely, the invention relates to a method for producing a transparent polymer film, which is free from problems of smoke emission and oily contamination and which enables easy control of retardation expressibility. The invention also relates to a transparent polymer film produced according to the production method, and to a retardation film, a polarizer and a liquid-crystal display device comprising the polymer film.

2. Description of the Related Art

Polymer films of typically cellulose esters, polyesters, polycarbonates, cycloolefin polymers, vinyl polymers and polyimides are used in silver halide photographic materials, retardation films, polarizers and liquid-crystal display devices. These polymers may be formed into films that are more excellent in surface smoothness and uniformity, and therefore their films are widely employed as optical films. For example, a cellulose ester film having a suitable moisture permeability may be directly stuck to a most popular polarizing film of polyvinyl alcohol (PVA)/iodine in an on-line process. Accordingly, cellulose acylate, especially cellulose acetate is widely employed as a protective film for polarizer.

In case where a transparent polymer film is used for optical applications such as retardation films, retardation film supports, polarizer-protective films, and liquid-crystal display devices, its optical anisotropy control is an extremely important element in determining the performance (for example, visibility) of display devices. The recent demand for widening the viewing angle of liquid-crystal display devices requires retardation compensation enhancement, and it is desired to suitably control the in-plane retardation (Re, hereinafter this may be simply referred to as "Re") and the thickness-direction retardation (Rth, hereinafter this may be simply referred to as "Rth") of the retardation film to be disposed between the polarizing film and the liquid-crystal cell of liquid-crystal display devices. In particular, a transparent polymer film having a small |Rth|/Re, especially having |Rth|/Re<0.5 are not easy to produce; and it is desired to develop a simple method for producing it with ease.

For producing a polymer film, disclosed is a continuous production method comprising adhering a thermoshrinking film to a polymer film, heating and stretching it, and thereafter peeling the thermoshrinking film (for example, see JP-A 5-157911 and JP-A 2000-231016). According to the Examples in these references, it is clarified that the polycarbonate films produced according to the method satisfy the condition of |Rth|/Re<0.5. However, the method is problematic in that it consumes a large quantity of thermoshrinking films and that the quality of the obtained films is not uniform. The problem is especially remarkable in high-elasticity polymers such as cellulose esters.

On the other hand, for producing transparent polymer films for optical use, preferably employed is a solution casting method capable of providing films of good surface smoothness. In case where films are produced according to a solution casting method, a plasticizer is preferably added for facilitating high-speed film formation. When a plasticizer is added, then the solvent may be readily evaporated away within a short period of time during drying in film formation according to a solution casting method, and therefore the residual solvent amount in the polymer film produced may be reduced. However, an ordinary plasticizer in a transparent polymer film may cause unfavorable phenomena when the film is processed under a severe condition during its production, or may have some negative influences on the film. For example, when a transparent polymer film containing an ordinary plasticizer is processed at a high temperature, it may emit smoke or may be contaminated with oil. Accordingly, the transparent polymer film containing a plasticizer is naturally limited in point of its production condition and processing condition. On the other hand, it is known to use a high-molecular-weight plasticizer in a triacetyl cellulose ester film for photography; however, it is difficult to expect the applicability of the film for optical use through high-temperature treatment (see JP-A 5-197073).

SUMMARY OF THE INVENTION

As in the above, no one could heretofore find out a practical method capable of controlling Re and Rth to fall within a desired range in a simplified manner not causing any undesirable phenomena and negative influences. Taking the prior-art problems into consideration, the present inventors have settled an object of providing a method for producing a transparent polymer film capable of controlling the retardation expression according to a relatively simple operation, not causing smoke emission and oily contamination.

The present inventors have assiduously studied and, as a result, have found that when a plasticizer satisfying a specific condition is used and when a polymer film is subjected to heat treatment at a high temperature of from Tc to less than $Tm_0$, which, however, is not employed generally even in a drying step, then the prior-art problems could be solved. Specifically, as a means for solving the problems, the inventors have reached the present invention that is as follows:

EMBODIMENT 1

A method for producing a transparent polymer film, comprising heat-treating a polymer film containing a polymer and a plasticizer having a number-average molecular weight of from 500 to 10000 and having a repetitive unit, at a temperature T (unit, °C.) satisfying the following formula (1)

$$Tc \leq T < Tm_0 \tag{1}$$

wherein Tc means crystallization temperature (unit, °C.) of the polymer film before heat treatment, and $Tm_0$ means melting point (unit, °C.) of the polymer film before heat treatment.

EMBODIMENT 2

The method for producing a transparent polymer film of the embodiment 1, wherein the film is stretched simultaneously with heat treatment.

EMBODIMENT 3

The method for producing a transparent polymer film of the embodiment 1 or 2, wherein the film is heat-treated while transported.

EMBODIMENT 4

The method for producing a transparent polymer film of the embodiment 1, wherein the film is heat-treated while transported and is stretched in the film-traveling direction.

EMBODIMENT 5

The method for producing a transparent polymer film of any one of the embodiments 1 to 4, wherein, after the heat treatment, the film is stretched at a temperature lower than Tc.

EMBODIMENT 6

The method for producing a transparent polymer film of any one of the embodiments 1 to 5, wherein the plasticizer is at least one selected from the group consisting of polyester plasticizers, polyester polyether plasticizers, polyester polyurethane plasticizers, polyacrylate plasticizers, and polymethacrylate plasticizers.

EMBODIMENT 7

The method for producing a transparent polymer film of the embodiment 6, wherein the film is heat-treated while transported, and after the heat treatment, it is stretched at a temperature lower than Tc in the direction perpendicular to the film-traveling direction.

EMBODIMENT 8

The method for producing a transparent polymer film of any one of the embodiments 1 to 7, wherein, before the heat treatment, the polymer film to be heat-treated is stretched.

EMBODIMENT 9

The method for producing a transparent polymer film of the embodiment 8, wherein the film is heat-treated while stretched in the same direction as that for the stretching before the heat treatment.

EMBODIMENT 10

The method for producing a transparent polymer film of any one of the embodiments 1 to 9, wherein the polymer film is shrunk by from 5 to 80% during the heat treatment.

EMBODIMENT 11

The method for producing a transparent polymer film of the embodiment 10, wherein the polymer film to be heat-treated is produced while transported, and the film is shrunk during the heat treatment in the direction perpendicular to the film-traveling direction.

EMBODIMENT 12

The method for producing a transparent polymer film of any one of the embodiments 1 to 11, wherein, after the heat treatment, the film is cooled at from 100 to 1,000,000° C./min.

EMBODIMENT 13

The method for producing a transparent polymer film of any one of the embodiments 1 to 12, wherein the plasticizer having a number-average molecular weight of from 500 to 10000 is incorporated in an amount of from 2 to 30% by mass of the polymer.

EMBODIMENT 14

The method for producing a transparent polymer film of any one of the embodiments 1 to 13, wherein the polymer is a cellulose acylate.

EMBODIMENT 15

The method for producing a transparent polymer film of the embodiment 14, wherein the cellulose acylate satisfies the following formula (3):

$$2.70 \leq SA+SB \leq 3.00 \qquad (3)$$

wherein SA means degree of substitution of the hydroxyl group of cellulose with an acetyl group; and SB means degree of substitution of the hydroxyl group of cellulose with an acyl group having at least 3 carbon atoms.

EMBODIMENT 16

The method for producing a transparent polymer film of the embodiment 14 or 15, wherein the cellulose acylate satisfies the following formula (4):

$$0 < SB \leq 3.0 \qquad (4)$$

wherein SB means degree of substitution of the hydroxyl group of cellulose with an acyl group having at least 3 carbon atoms.

EMBODIMENT 17

The method for producing a transparent polymer film of any one of the embodiments 1 to 16, wherein the polymer film to be heat-treated is produced while transported, and this is stretched in the film-traveling direction by from 0.1% to less than 15% while it has a residual solvent content of from 5 to 1000%.

EMBODIMENT 18

The method for producing a transparent polymer film of any one of the embodiments 1 to 17, wherein the polymer film to be heat-treated is produced while transported, and this is stretched in the film-traveling direction by from 15% to 300% while it has a residual solvent content of from 5 to 1000%.

EMBODIMENT 19

The method for producing a transparent polymer film of any one of the embodiments 1 to 18, wherein the polymer film to be heat-treated has a moisture permeability of at least 100 $g/(m^2 \cdot day)$ in terms of the film having a thickness of 80 µm.

EMBODIMENT 20

The method for producing a transparent polymer film of any one of the embodiments 1 to 19, wherein the polymer film to be heat-treated contains an additive composition of increasing Rth of the polymer film to be heat-treated.

EMBODIMENT 21

The method for producing a transparent polymer film of any one of the embodiments 1 to 20, which is to produce a transparent polymer film satisfying the following formula (2):

$$|Rth|/Re<0.5 \qquad (2)$$

wherein Re means in-plane retardation (unit, nm) of the film; and Rth means thickness-direction retardation (unit, nm).

EMBODIMENT 22

A method for controlling the retardation expression of a polymer transparent film, comprising heat-treating a transparent polymer film containing a polymer and a plasticizer having a number-average molecular weight of from 500 to 10000 and having a repetitive unit, at a temperature T (unit, ° C.) satisfying the following formula (1):

$$Tc \leq T < Tm_0 \qquad (1)$$

wherein Tc means crystallization temperature (unit, ° C.) of the polymer film before heat treatment, and $Tm_0$ means melting point (unit, ° C.) of the polymer film before heat treatment.

EMBODIMENT 23

A method for producing a transparent polymer film satisfying the following formula (2), comprising heat-treating a transparent polymer film containing a polymer and a plasticizer having a number-average molecular weight of from 500 to 10000 and having a repetitive unit, at a temperature T (unit, ° C.) satisfying the following formula (1):

$$Tc \leq T < Tm_0 \qquad (1)$$

wherein Tc means crystallization temperature (unit, ° C.) of the polymer film before heat treatment, and $Tm_0$ means melting point (unit, ° C.) of the polymer film before heat treatment, $$|Rth|/Re<0.5 \qquad (2)$$

wherein Re means in-plane retardation (unit, nm) of the film; and Rth means thickness-direction retardation (unit, nm).

EMBODIMENT 24

A transparent polymer film produced according to the production method of any one of the embodiments 1 to 23.

EMBODIMENT 25

The transparent polymer film of the embodiment 24, wherein the polymer is a cellulose acylate.

EMBODIMENT 26

A retardation film comprising at least one transparent polymer film of the embodiment 24 or 25.

EMBODIMENT 27

A polarizer comprising at least one transparent polymer film of the embodiment 24 or 25.

EMBODIMENT 28

The polarizer of the embodiment 27, wherein the transparent polymer film is directly stuck to the polarizing film.

EMBODIMENT 29

A liquid-crystal display device comprising at least one of the transparent polymer film of the embodiment 24 or 25, the retardation film of the embodiment 26, or the polarizer of the embodiment 27 or 28.

According to the production method of the invention, the retardation expressibility of a transparent film can be readily controlled through relatively simple operation of heat treatment not causing smoke emission or oily contamination. In particular, a transparent film having a retardation region of |Rth|/Re<0.5, which has heretofore been difficult to produce according to conventional methods, can be readily produced in the invention. Further, according to the production method of the invention, the trimming aptitude of the polymer film can be noticeably improved in the step (trimming step) of trimming both edges of the polymer film produced through the heat treatment.

BEST MODE FOR CARRYING OUT THE INVENTION

The method for producing a transparent polymer film of the invention and the transparent polymer film produced according to the method are described in detail hereinunder. The description of the constitutive elements of the invention given hereinunder may be for some typical embodiments of the invention, to which, however, the invention should not be limited. In this description, the numerical range expressed by the wording "a number to another number" means the range that falls between the former number indicating the lowermost limit of the range and the latter number indicating the uppermost limit thereof.

<<Method for Producing Transparent Polymer Film>>
[Polymer]

First described is the polymer usable in the method for producing a transparent polymer film of the invention.

The polymer to be the constitutive element of the transparent polymer film of the invention may be a polymer capable of constituting a transparent polymer film for optical use, including, for example, cellulose esters (e.g., cellulose triacetate, cellulose acetate propionate, cellulose acetate butyrate, cellulose tripropionate, cellulose diacetate), polyolefins (e.g., polyethylene, polypropylene, norbornene-based polymer), polyesters (e.g., polymethacrylate, polyacrylate), polycarbonates, cyclo-olefin polymers, polyarylates, polysulfones, vinyl polymers (e.g., polyvinyl alcohol), polyamides, polyimides, cyclo-olefin copolymers, polynorbornene, etc. The polymer preferably has a hydrophilic structure such as a hydroxyl group, an amido group, an imido group or an ester group in the backbone chain or in the side chains thereof, for the purpose of attaining a suitable degree of moisture permeability. In the invention, a copolymer may be sued, or a polymer mixture may also be used. The polymer is preferably cellulose ester, more preferably cellulose acylate.

The polymer may be powdery or granular, or may also be in the form of pellets.

Preferably, the water content of the polymer is at most 1.0% by mass, more preferably at most 0.7% by mass, most preferably at most 0.5% by mass. As the case may be, the water content is preferably at most 0.2% by mass. In case where the water content of the polymer oversteps the preferred range, then it is desirable to use the polymer after dried by heating.

One or more these polymers may be used herein either singly or as combined.

The cellulose ester includes cellulose ester compounds, and ester-substituted cellulose skeleton-having compounds that are produced by biologically or chemically introducing a functional group to a starting cellulose material. Of those, especially preferred is cellulose acylate.

The essential polymer ingredient of the transparent polymer film of the invention is preferably the above-mentioned cellulose acylate. The "essential polymer ingredient" as referred to herein is, when the film is formed of a single polymer, that single polymer; but when the film is formed of plural polymers, then the polymer having a highest mass fraction of those constitutive polymers is the "essential polymer ingredient".

The cellulose ester is an ester of cellulose and acid. The acid that constitutes the ester is preferably an organic acid, more preferably a carboxylic acid, even more preferably a fatty acid having from 2 to 22 carbon atoms, most preferably a lower fatty acid having from 2 to 4 carbon atoms.

The cellulose acylate is an ester of cellulose and carboxylic acid. In the cellulose acylate, all or a part of the hydrogen atoms of the hydroxyl groups existing at the 2-, 3- and 6-positions of the glucose unit that constitutes cellulose are substituted with an acyl group. Examples of the acyl group are an acetyl group, a propionyl group, a butyryl group, an isobutyryl group, a pivaloyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, a cyclohexanecarbonyl group, an oleoyl group, a benzoyl group, a naphthylcarbonyl group, a cinnamoyl group. The acyl group is preferably an acetyl group, a propionyl group, a butyryl group, a dodecanoyl group, an octadecanoyl group, a pivaloyl group, an oleoyl group, a benzoyl group, a naphthylcarbonyl group, a cinnamoyl group, most preferably an acetyl group, a propionyl group, a butyryl group.

The cellulose ester may be an ester of cellulose with plural acids. The cellulose acylate may be substituted with plural acyl groups.

The degree of substitution of the hydroxyl group of cellulose with an acetyl group (having 2 carbon atoms) in cellulose acylate is represented by SA; and the degree of substitution of the hydroxyl group of cellulose with an acyl group having at least 3 carbon atoms is by SB. By controlling SA and SB, the Re expressibility and the humidity dependence of retardation of the transparent polymer film produced according to the production method of the invention may be controlled. In addition, Tc may also be controlled; and accordingly, the heat-treatment temperature may be thereby controlled. The humidity dependence of retardation means the humidity-dependent retardation change of the film.

Depending on the necessary optical properties of the film of the invention, or that is, the transparent polymer film produced according to the production method of the invention, (SA+SB) is suitably controlled. Preferably, 2.70<SA+SB≦3.00, more preferably 2.88≦SA+SB≦3.00, even more preferably 2.89≦SA+SB≦2.99, still more preferably 2.90≦SA+SB≦2.98, further more preferably 2.92≦SA+SB≦2.97. Increasing (SA+SB) results in the increase in Re and the decrease in Tc of the heat-treated film, therefore reducing the humidity dependence of retardation. When Tc is set low, then heat-treatment temperature may be set relatively low.

By controlling SB, the humidity dependence of retardation of the transparent polymer film produced according to the production method of the invention may be controlled. Increasing SB results in the reduction in the humidity dependence of retardation, and the melting point of the film is thereby lowered. In consideration of the balance between the humidity dependence of retardation and the melting point depression, the SB range is preferably 0<SB≦3.0, more preferably 0<SB≦1.0, even more preferably 0.1≦SB≦0.7. In case where the hydroxyl groups in cellulose are all substituted, the above-mentioned degree of substitution is 3.

Cellulose ester may be produced in known methods.

For example, the basic principle of a method of production of cellulose acylate is described in Nobuhiko Migita, et al., Wood Chemistry, pp. 180-190 (Kyoritsu Publishing, 1968) One typical production method for cellulose acylate is a liquid-phase acetylation method with a carboxylic acid anhydride-carboxylic acid-sulfuric acid catalyst. Concretely, a cellulose material such as cotton linter or wood pulp is pretreated with a suitable amount of a carboxylic acid such as acetic acid, then esterified by putting it into a previously-cooled acylation mixture liquid to thereby produce a complete cellulose acylate (the total of the degree of acylation at the 2-, 3- and 6-position thereof is almost 3.00). The acylation mixture liquid generally contains a carboxylic acid serving as a solvent, a carboxylic acid anhydride serving as an esterifying agent and sulfuric acid serving as a catalyst. In general, the amount of the carboxylic acid anhydride is a stoichiometrically excessive amount over the total amount of the cellulose to be reacted with it and water existing in the system.

After the acylation, the excessive carboxylic acid anhydride still remaining in the system is hydrolyzed, for which water or water-containing acetic acid is added thereto. Then, a part of the esterification catalyst is neutralized, for which an aqueous solution of a neutralizing agent (e.g., calcium, magnesium, iron, aluminium or zinc carbonate, acetate, hydroxide or oxide) may be added to the system. Next, the obtained complete cellulose acylate is kept at 20 to 90° C. in the presence of a small amount of an acylation catalyst (generally, this is the remaining sulfuric acid) to thereby saponify and ripen it into a cellulose acylate having a desired degree of acyl substitution and a desired degree of polymerization. When the desired cellulose acylate is obtained, the catalyst still remaining in the system is completely neutralized with the above-mentioned neutralizing agent, or not neutralized, the cellulose acylate solution is put into water or diluted sulfuric acid (or water or diluted sulfuric acid is put into the cellulose acylate solution) to thereby separate the cellulose acylate, which is then washed and stabilized to be the intended cellulose acylate.

The degree of polymerization of the cellulose acylate is preferably from 150 to 500 in terms of the viscosity-average degree of polymerization thereof, more preferably from 200 to 400, even more preferably from 220 to 350. The viscosity-average degree of polymerization may be measured according to an Uda et al's limiting viscosity method (Kazuo Uda, Hideo Saito; the Journal of the Society of Fiber Science and Technology of Japan, Vol. 18, No. 1, pp. 105-120, 1962). The method for measuring the viscosity-average degree of polymerization is described also in JP-A 9-95538.

Cellulose acylate having a small amount of a low-molecular component may have a high mean molecular weight (degree of polymerization), but its viscosity is generally lower than ordinary cellulose acylate. Cellulose acylate having a small amount of a low-molecular component may be obtained by removing the low-molecular component from cellulose acylate produced in an ordinary manner. The removal of the low-molecular component may be attained by washing cellulose acylate with a suitable organic solvent. Further, cellulose acylate having a small amount of a low-molecular component may also be obtained by synthesis. When cellulose acylate having a small amount of a low-molecular component therein is produced, it is desirable that the amount of the sulfuric acid catalyst for use in acylation is controlled to be from 0.5 to 25 parts by mass relative to 100 parts by mass of cellulose. When the amount of the sulfuric acid catalyst is within the above range, then cellulose acylate may be produced which is favorable in point of the molecular weight distribution thereof (having a uniform molecular weight distribution). The degree of polymerization of cellulose acylate and the molecular weight distribution thereof may be determined through gel permeation chromatography (GPC) or the like.

The starting cotton for cellulose ester and the method for producing it are described also in Hatsumei Kyokai Disclosure Bulletin (No. 2001-1745, published by the Hatsumei Kyokai on Mar. 15, 2001), pp. 7-12.

[Plasticizer]

(Characteristics of the Plasticizer for Use in the Invention)

The polymer film of the invention is characterized by containing a plasticizer having a molecular weight of from 500 to 10000 and a repetitive unit (hereinafter this is referred to as a polymer plasticizer). In solution casting, plasticizer is an indispensable ingredient for promoting the evaporation of solvent and for reducing residual solvent. Also in a polymer film produced according to a solution casting method, plasticizer is an useful ingredient for preventing discoloration and film strength reduction. Further, adding the polymer plasticizer to the polymer film of the invention is effective from the viewpoint of improving the film quality, for example, for improving the mechanical properties of the film, for making the film flexible, for making the film resistant to water absorption, and for reducing the water permeability of the film. In addition, in the invention, the plasticizer is extremely effective for improving the handlability of the film in its production process, as demonstrated in Examples given hereinunder.

The polymer plasticizer in the invention is characterized by having a repetitive unit in the compound. The polymer plasticizer for use in the invention has a number-average molecular weight of from 500 to 10000, preferably from 600 to 8000, more preferably from 700 to 5000, even more preferably from 700 to 3500. However, the polymer plasticizer in the invention is not limited to the compound having such a repetitive unit segment, but may be a mixture with a compound not having a repetitive unit.

The polymer plasticizer in the invention may be liquid or solid at the environment temperature or humidity at which it is used (in general, at room temperature, or that is, at 25° C. and relative humidity of 60%). Preferably, its color is as light as possible, and more preferably, it is colorless. Preferably, it is thermally stable at high temperatures, and more preferably its decomposition starting temperature is not lower than 150° C., even more preferably not lower than 200° C. Its amount to be added may be any one not having any negative influence on the optical properties and the physical properties of the film; and its amount may be suitably selected within a range not detracting from the object of the invention. Concretely, its amount may be from 1 to 50 parts by mass relative to 100 parts by mass of the polymer to constitute the film, more preferably from 2 to 40 parts by mass, even more preferably from 5 to 30 parts by mass.

The polymer plasticizer for use in the invention is described in detail hereinunder with reference to its specific examples, to which, however, the polymer plasticizer for use in the invention should not be limited.

(Type of Polymer Plasticizer)

Not specifically defined, the polymer plasticizer for use in the polymer film of the invention is preferably at least one plasticizer having a number-average molecular weight of at least 500 and selected from polyester plasticizers, polyether plasticizers, polyurethane plasticizers, polyester polyurethane plasticizers, polyester polyether plasticizers, polyether polyurethane plasticizers, polyamide plasticizers, polysulfone plasticizers, polysulfone amide plasticizers, and other polymer plasticizers mentioned below.

More preferably, at least one of them is any of polyester plasticizers, polyether plasticizers, polyurethane plasticizers, polyester polyurethane plasticizers, polyester polyether plasticizers, polyether polyurethane plasticizers, polyamide plasticizers, polysulfone plasticizers and polysulfone amide plasticizers, even more preferably any of polyester plasticizers, polyester polyurethane plasticizers and polyester polyether plasticizers. Preferred polymer plasticizers for use in the invention are described below according to their kinds.

(Polyester Plasticizer)

The polyester plasticizer for use in the invention is described. Not specifically defined, the polyester plasticizer preferred for use in the invention is one produced through reaction of a dicarboxylic acid and a glycol, and both ends of the reaction product may be as such, or may be blocked by further reaction with a monocarboxylic acid or a monoalcohol. The terminal blocking may be effected for the reason that the absence of a free carboxylic acid in the plasticizer is effective for the storability of the plasticizer. The dicarboxylic acid for the polyester plasticizer for use in the invention is preferably an aliphatic dicarboxylic having from 4 to 12 carbon atoms, or an aromatic dicarboxylic acid having from 8 to 12 carbon atoms.

The alkylenedicarboxylic acid component having from 4 to 12 carbon atoms preferred for the polyester plasticizer in the invention includes, for example, succinic acid, maleic acid, fumaric acid, glutaric acid, adipic acid, azelaic acid, sebacic acid, dodecanedicarboxylic acid, 1,4-cyclohexanedicarboxylic acid. The arylenedicarboxylic acid component having from 8 to 12 carbon atoms includes phthalic acid, terephthalic acid, 1,5-naphthalenedicarboxylic acid, 1,4-naphthalenedicarboxylic acid. One or more of these may be used either singly or as combined. The glycol for the polyester plasticizer is described. It includes an aliphatic or alicyclic glycol having from 2 to 12 carbon atoms, and an aromatic glycol having from 6 to 12 carbon atoms.

The aliphatic glycol and the alicyclic glycol having from 2 to 12 carbon atoms include ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol. One or more of these glycols may be used either singly or as combined.

Preferably, the polyester plasticizer in the invention is protected with a monoalcohol residue or a monocarboxylic acid residue in order that both ends of the polyester plasticizer are not a carboxylic acid. In this case, the monoalcohol residue is preferably a substituted or unsubstituted monoalcohol residue having from 1 to 30 carbon atoms, including, for example, aliphatic alcohols such as methanol, ethanol, propanol, isopropanol, butanol, isobutanol, pentanol, isopentanol, hexanol, isohexanol, cyclohexyl alcohol, octanol, isooctanol, 2-ethylhexyl alcohol, nonyl alcohol, isononyl alcohol, tert-nonyl alcohol, decanol, dodecanol, dodecahexanol, dodecaoctanol, allyl alcohol, oleyl alcohol; and substituted alcohols such as benzyl alcohol, 3-phenylpropanol.

Alcohol residues for terminal blocking that are preferred for use in the invention are methanol, ethanol, propanol, isopropanol, butanol, isobutanol, isopentanol, hexanol, isohexanol, cyclohexyl alcohol, isooctanol, 2-ethylhexyl alcohol, isononyl alcohol, oleyl alcohol, benzyl alcohol, more preferably methanol, ethanol, propanol, isobutanol, cyclohexyl alcohol, 2-ethylhexyl alcohol, isononyl alcohol, benzyl alcohol.

In blocking with a monocarboxylic acid residue, the monocarboxylic acid for use as the monocarboxylic acid residue is preferably a substituted or unsubstituted monocarboxylic acid having from 1 to 30 carbon atoms. It may be an aliphatic monocarboxylic acid or an aromatic monocarboxylic acid. Preferred aliphatic monocarboxylic acids are described. They include acetic acid, propionic acid, butanoic acid, caprylic acid, caproic acid, decanoic acid, dodecanoic acid, stearic acid, oleic acid. Preferred aromatic monocarboxylic acids are, for example, benzoic acid, p-tert-butylbenzoic acid, orthotoluic acid, metatoluic acid, paratoluic acid, dimethylbenzoic acid, ethylbenzoic acid, normal-propylbenzoic acid, aminobenzoic acid, acetoxybenzoic acid. One or more of these may be used either singly or as combined.

Specific examples of preferred polyester plasticizers are poly(ethylene glycol/adipic acid) ester, poly(propylene glycol/adipic acid) ester, poly(1,3-butanediol/adipic acid) ester, poly(propylene glycol/sebacic acid) ester, poly(1,3-butanediol/sebacic acid) ester, poly(1,6-hexanediol/adipic acid) ester, poly(propylene glycol/phthalic acid) ester, poly(1,3-butanediol/phthalic acid) ester, poly(propylene glycol/terephthalic acid) ester, poly(propylene glycol/1,5-naphthalene-dicarboxylic acid) ester, poly(propylene glycol/terephthalic acid) ester of which both ends are blocked with 2-ethylhexyl alcohol ester, poly(propylene glycol/adipic acid) ester of which both ends are blocked with 2-ethylhexyl alcohol ester, and acetylated poly(butanediol/adipic acid) ester.

These polyesters may be readily produced in any ordinary methods. Concretely, for example, the above-mentioned dibasic acid or its alkyl ester is reacted with a glycol through polyesterification or interesterification according to a thermal fusion condensation method; or the acid chloride is reacted with a glycol according to an interfacial condensation method. The polyester plasticizers are described in detail in Koichi Murai, Plasticizers, Their Theory and Application, (by Miyuki Publishing, Mar. 1, 1973, 1st Edition). In addition, the materials described in JP-A 05-155809, 05-155810, 05-197073, 2006-259494, 07-330670, 2006-342227, 2007-003679 are also usable herein.

Commercial products are also usable. For example, Adeka's polyester plasticizers described in Diary 2007, pp. 5-27 (various types of Adekacizer P series, Adekacizer PN series are shown) are usable; Dai-Nippon Ink Chemical Industry's various commercial products of Polylight series described in List of Polymer-Related Commercial Products, 2007, p. 25 are usable; and Dai-Nippon Ink Chemical Industry's various commercial products of Polycizer series described in DIC's Polymer Modifiers (issued Jan. 4, 2004, 000VIII), pp. 2-5 are usable. Further, US CP HALL's Plasthall P series are available. Velsicol Chemicals (Rosemont, Ill.) commercially sell benzoyl-functionalized polyethers as trade name of Benzoflex (e.g., Benzoflex 400, polypropylene glycol dibenzoate).

(Polyester Polyether Plasticizer)

Next described are polyester polyether plasticizers for use in the invention. The polyester polyether plasticizers for use in the invention are condensed polymers of a dicarboxylic acid and a polyether diol. The dicarboxylic acid may be the aliphatic dicarboxylic acid having from 4 to 12 carbon atoms or the aromatic dicarboxylic acid having from 8 to 12 carbon atoms described in the above for polyester plasticizers.

The polyether having an aliphatic glycol with from 2 to 12 carbon atoms includes polyethylene ether glycol, polypropylene ether glycol, polytetramethylene ether glycol, and their combinations. Commercial polyether glycols that are typically usable herein are Carbowax resin, Pluornics resin and Niax resin. In producing the polyester polyether plasticizers for use in the invention, employable is any polymerization method well known to those skilled in the art.

Polyester polyether plasticizers described in U.S. Pat. No. 4,349,469 are usable herein. Basically, they are polyester polyether plasticizers produced from, for example, 1,4-cyclohexanedicarboxylic acid as a dicarboxylic acid component and 1,4-cyclohexanedimethanol and polytetramethylene ether glycol as a polyether component. Other useful polyester polyether plasticizers are commercial resins such as DuPont's Hytrel copolyesters, GAF's Galflex copolymers. For these, the materials described in JP-A 5-197073 are employable. Adeka's commercial products, Adekacizer RS series are usable herein. ICI Chemicals (Wilmington, Del.) commercially sell polyester ether plasticizers of alkyl-functionalized polyalkylene oxides as trade name of Pycal series (e.g., Pycal 94, polyethylene oxide phenyl ester).

(Polyester Polyurethane Plasticizer)

Polyester polyurethane plasticizers for use in the invention are described. The plasticizers may be produced through condensation of a polyester with an isocyanate compound. The polyester may be the unblocked polyester described in the above for polyester plasticizers; and those described for polyester plasticizers are also preferably used herein.

The diisocyanate component to constitute the polyurethane structure includes $OCN(CH_2)_p NCO$ (p=2 to 8) polymethylene isocyanates such as typically ethylene diisocyanate, trimethylene diisocyanate, tetramethylene diisocyanate, hexamethylene diisocyanate; and aromatic diisocyanates such as p-phenylene diisocyanate, tolylene diisocyanate, p,p'-diphenylmethane diisocyanate, 1,5-naphthylene diisocyanate; and further m-xylylene diisocyanate, to which, however, the diisocyanate compound should not be limited. Of those, especially preferred are tolylene diisocyanate, m-xylylene diisocyanate, tetramethylene diisocyanate.

The polyester polyurethane plasticizers for use in the invention may be readily produced in an ordinary method in which starting compounds, a polyester diol and a diisocyanate are mixed and stirred under heat. For these, the materials described in JP-A 5-197073, 2001-122979, 2004-175971, 2004-175972 may be used.

(Other Polymer Plasticizers)

In the invention, not only the above-mentioned polyester plasticizers, polyester polyether plasticizers and polyester polyurethane plasticizers, but also any other polymer plasticizers are usable. The other polymer plasticizers are aliphatic hydrocarbon polymers; alicyclic hydrocarbon polymers; acrylic polymers such as polyacrylates and polymethacrylates (in which the ester group is, for example, a methyl group, an ethyl group, a propyl group, a butyl group, an isobutyl group, a pentyl group, a hexyl group, a cyclohexyl group, an octyl group, a 2-ethylhexyl group, a nonyl group, an isononyl group, a tert-nonyl group, a dodecyl group, a tridecyl group, a stearyl group, an oleyl group, a benzyl group, a phenyl group); vinylic polymers such as polyvinyl isobutyl ether, poly-N-vinylpyrrolidone; styrenic polymers such as polystyrene, poly-4-hydroxystyrene; polyethers such as polyethylene oxide, polypropylene oxide; and polyamides, polyurethanes, polyureas, phenol/formaldehyde condensates, urea/formaldehyde condensates, polyvinyl acetate, etc.

These polymer plasticizers may be homopolymers comprising one type of a repetitive unit, or may be copolymers comprising plural types of repetitive structures. Two or more of the above polymers may be used, as combined. These polymer plasticizers may be used either alone or as combined; and in any case, they may exhibit the same effect. Of those, preferred are polyacrylates, polymethacrylates and their copolymers with any other vinyl monomer. Especially preferred are polymer plasticizers basically comprising acrylic polymers such as polyacrylates and polymethacrylates (in which the ester group is a methyl group, an ethyl group, a propyl group, a butyl group, a hexyl group, a cyclohexyl group, a 2-ethylhexyl group, an isononyl group, an oleyl group).

(Specific Examples of Polymer Plasticizers)

Preferred specific examples of polymer plasticizers are described below; however, the polymer plasticizers usable in the invention should not be limited to these.

PP-1: Condensate of ethanediol/succinic acid (1/1 by mol) (number-average molecular weight 2500)
PP-2: Condensate of 1,3-propanediol/glutaric acid (1/1 by mol) (number-average molecular weight 1500)
PP-3: Condensate of 1,3-propanediol/adipic acid (1/1 by mol) (number-average molecular weight 1300)
PP-4: Condensate of 1,3-propanediol/ethylene glycol/adipic acid (1/1/2 by mol) (number-average molecular weight 1500)
PP-5: Condensate of 2-methyl-1,3-propanediol/adipic acid (1/1 by mol) (number-average molecular weight 1200)
PP-6: Condensate of 1,4-butanediol/adipic acid (1/1 by mol) (number-average molecular weight 1500)
PP-7: Condensate of 1,4-cyclohexanediol/succinic acid (1/1 by mol) (number-average molecular weight 800)
PP-8: Condensate of 1,3-propanediol/succinic acid (1/1 by mol) blocked with butyl ester at both ends (number-average molecular weight 1300)
PP-9: Condensate of 1,3-propanediol/glutaric acid (1/1 by mol) blocked with cyclohexyl ester at both ends (number-average molecular weight 1500)
PP-10: Condensate of ethanediol/succinic acid (1/1 by mol) blocked with 2-ethylhexyl ester at both ends (number-average molecular weight 3000)
PP-11: Condensate of 1,3-propanediol/ethylene glycol/adipic acid (1/1/2 by mol) blocked with isononyl ester at both ends (number-average molecular weight 1500)
PP-12: Condensate of 2-methyl-1,3-propanediol/adipic acid (1/1 by mol) blocked with propyl ester at both ends (number-average molecular weight 1300)
PP-13: Condensate of 2-methyl-1,3-propanediol/adipic acid (1/1 by mol) blocked with 2-ethylhexyl ester at both ends (number-average molecular weight 1300)
PP-14: Condensate of 2-methyl-1,3-propanediol/adipic acid (1/1 by mol) blocked with isononyl ester at both ends (number-average molecular weight 1300)
PP-15: Condensate of 1,4-butanediol/adipic acid (1/1 by mol) blocked with butyl ester at both ends (number-average molecular weight 1800)
PP-16: Condensate of ethanediol/terephthalic acid (1/1 by mol) (number-average molecular weight 2000)
PP-17: Condensate of 1,3-propanediol/1,5-naphthalenedicarboxylic acid (1/1 by mol) (number-average molecular weight 1500)
PP-18: Condensate of 2-methyl-1,3-propanediol/isophthalic acid (1/1 by mol) (number-average molecular weight 1200)
PP-19: Condensate of 1,3-propanediol/terephthalic acid (1/1 by mol) blocked with benzyl ester at both ends (number-average molecular weight 1500)
PP-20: Condensate of 1,3-propanediol/1,5-naphthalenedicarboxylic acid (1/1 by mol) blocked with propyl ester at both ends (number-average molecular weight 1500)
PP-21: Condensate of 2-methyl-1,3-propanediol/isophthalic acid (1/1 by mol) blocked with butyl ester at both ends (number-average molecular weight 1200)
PP-22: Condensate of poly(mean degree of polymerization 5) propylene ether glycol/succinic acid (1/1 by mol) (number-average molecular weight 1800)
PP-23: Condensate of poly(mean degree of polymerization 3) ethylene ether glycol/glutaric acid (1/1 by mol) (number-average molecular weight 1600)
PP-24: Condensate of poly(mean degree of polymerization 4) propylene ether glycol/adipic acid (1/1 by mol) (number-average molecular weight 2200)
PP-25: Condensate of poly(mean degree of polymerization 4) propylene ether glycol/phthalic acid (1/1 by mol) (number-average molecular weight 1500)
PP-26: Condensate of poly(mean degree of polymerization 5) propylene ether glycol/succinic acid (1/1 by mol) blocked with butyl ester at both ends (number-average molecular weight 1900)
PP-27: Condensate of poly(mean degree of polymerization 3) ethylene ether glycol/glutaric acid (1/1 by mol) blocked with 2-ethylhexyl ester at both ends (number-average molecular weight 1700)
PP-28: Condensate of poly(mean degree of polymerization 4) propylene ether glycol/adipic acid (1/1 by mol) blocked with tert-nonyl ester at both ends (number-average molecular weight 1300)
PP-29: Condensate of poly(mean degree of polymerization 4) propylene ether glycol/phthalic acid (1/1 by mol) blocked with propyl ester at both ends (number-average molecular weight 1600)
PP-30: Polyester urethane compound produced through condensation of 1,3-propanediol/succinic acid (1/1 by mol) condensate (number-average molecular weight 1500) with trimethylene diisocyanate (1 mol)
PP-31: Polyester urethane compound produced through condensation of 1,3-propanediol/glutaric acid (1/1 by mol) condensate (number-average molecular weight 1200) with tetramethylene diisocyanate (1 mol)
PP-32: Polyester urethane compound produced through condensation of 1,3-propanediol/adipic acid (1/1 by mol) condensate (number-average molecular weight 1000) with p-phenylene diisocyanate (1 mol)
PP-33: Polyester urethane compound produced through condensation of 1,3-propanediol/ethylene glycol/adipic acid (1/1/2 by mol) condensate (number-average molecular weight 1500) with tolylene diisocyanate (1 mol)
PP-34: Polyester urethane compound produced through condensation of 2-methyl-1,3-propanediol/adipic acid (1/1 by mol) condensate (number-average molecular weight 1200) with m-xylylene diisocyanate (1 mol)
PP-35: Polyester urethane compound produced through condensation of 1,4-butanediol/adipic acid (1/1 by mol) condensate (number-average molecular weight 1500) with tetramethylene diisocyanate (1 mol)
PP-36: Polyisopropyl acrylate (number-average molecular weight 1300)
PP-37: Polybutyl acrylate (number-average molecular weight 1300)
PP-38: Polyisopropyl methacrylate (number-average molecular weight 1200)
PP-39: Poly(methyl methacrylate/butyl methacrylate) (8/2 by mol) (number-average molecular weight 1600)

PP-40: Poly(methyl methacrylate/2-ethylhexyl methacrylate) (9/1 by mol) (number-average molecular weight 1600)
PP-41: Poly(vinyl acetate) (number-average molecular weight 2400)

[Polymer Solution]

The polymer film for use in the production method of the invention (hereinafter this may be referred to as "polymer film to be heat-treated" or "un-heat-treated polymer film" in this description) may be produced, for example, from a polymer solution containing the above-mentioned polymer and various additives, according to a solution casting film formation method. The polymer solution usable in the solution casting film formation method is described below.

(Solvent)

The main solvent for the polymer solution (preferably cellulose ester solution) for use in producing the polymer film to be used in the production method of the invention is preferably an organic solvent, a good solvent for the polymer. Preferably, the organic solvent has a boiling point of not higher than 80° C. from the viewpoint of reducing the drying load. The boiling point of the organic solvent is more preferably from 10 to 80° C., even more preferably from 20 to 60° C. As the case may be an organic solvent having a boiling point of from 30 to 45° C. may also be favorably used as the main solvent.

The main solvent includes halogenohydrocarbons, esters, ketones, ethers, alcohols and hydrocarbons; and these may have a branched structure or a cyclic structure. The main solvent may have two or more functional groups of ester, ketone, ether and alcohol (i.e., —O—, —CO—, —COO—, —OH). The hydrogen atom in the hydrocarbon moiety of the above ester, ketone, ether and alcohol may be substituted with a halogen atom (especially, fluorine atom). The main solvent of the polymer solution (preferably cellulose ester solution) for use in the production of the polymer film for use in the production method of the invention is, when a single solvent is used in the polymer solution, that single solvent; but when plural solvents are used in the polymer solution, then the solvent having a highest mass fraction of those constitutive solvents is the main solvent. As the main solvent, preferred are halogenohydrocarbons.

The halogenohydrocarbon is preferably a chlorohydrocarbon, for example, including dichloromethane and chloroform. More preferred is dichloromethane.

The ester includes, for example, methyl formate, ethyl formate, methyl acetate, ethyl acetate.

The ketone includes, for example, acetone, methyl ethyl ketone.

The ether includes, for example, diethyl ether, methyl tert-butyl ether, diisopropyl ether, dimethoxymethane, 1,3-dioxolane, 4-methyldioxolane, tetrahydrofuran, methyltetrahydrofuran, 1,4-dioxane.

The alcohol includes, for example, methanol, ethanol, 2-propanol.

The hydrocarbon includes, for example, n-pentane, cyclohexane, n-hexane, benzene, toluene.

The organic solvent that may be used along with the main solvent includes halogenohydrocarbons, esters, ketones, ethers, alcohols, and hydrocarbons. These may have a branched structure or a cyclic structure. The organic solvent may have two or more functional groups of ester, ketone, ether and alcohol (i.e., —O—, —CO—, —COO—, —OH). The hydrogen atom in the hydrocarbon moiety of the above ester, ketone, ether and alcohol may be substituted with a halogen atom (especially, fluorine atom).

The halogenohydrocarbon is preferably a chlorohydrocarbon, for example, including dichloromethane and chloroform. More preferred is dichloromethane.

The ester includes, for example, methyl formate, ethyl formate, propyl formate, pentyl formate, methyl acetate, ethyl acetate, pentyl acetate.

The ketone includes, for example, acetone, methyl ethyl ketone, diethyl ketone, diisobutyl ketone, cyclopentanone, cyclohexanone, methylcyclohexanone.

The ether includes, for example, diethyl ether, methyl tert-butyl ether, diisopropyl ether, dimethoxymethane, dimethoxyethane, 1,4-dioxane, 1,3-dioxolane, 4-methyldioxolane, tetrahydrofuran, methyltetrahydrofuran, anisole, phenetole.

The alcohol includes, for example, methanol, ethanol, 1-propanol, 2-propanol, 1-butanol, 2-butanol, tert-butanol, 1-pentanol, 2-methyl-2-butanol, cyclohexanol, 2-fluoroethanol, 2,2,2-trifluoroethanol, 2,2,3,3-tetrafluoro-1-propanol. Preferred are alcohols having from 1 to 4 carbon atoms; more preferred are methanol, ethanol, butanol; most preferred are methanol, butanol. The hydrocarbon includes, for example, n-pentane, cyclohexane, n-hexane, benzene, toluene, xylene.

The organic solvent having at least two functional groups include, for example, 2-ethoxyethyl acetate, 2-methoxyethanol, 2-butoxyethanol, methyl acetacetate.

When the polymer that constitutes the transparent polymer film of the invention has a hydrogen-bonding functional group such as hydroxyl group, ester or ketone, then the solvent preferably contains alcohol in an amount of from 5 to 30% by mass of the overall solvent, more preferably from 7 to 25% by mass, even more preferably from 10 to 20% by mass, from the viewpoint of reducing the peeling load from the casting support. The polymer having a hydrogen-bonding functional group includes cellulose acylate.

Controlling the alcohol content makes it possible to readily control the Re and Rth expressibility of the transparent polymer film produced according to the production method of the invention. Concretely, increasing the alcohol content makes it possible to relatively lower the heat-treatment temperature and to increase the ultimate range of Re and Rth.

It is desirable that the polymer solution to be used in producing the polymer film for use in the production method of the invention contains an organic solvent which has a boiling point of at least 95° C. and has an evaporation profile of such that its proportion to evaporate along with halogenohydrocarbon in the initial stage of drying is small and then it is gradually concentrated and which is a poor solvent for cellulose ester, in an amount of from 1 to 15% by mass, more preferably from 1.5 to 13% by mass, even more preferably from 2 to 10% by mass. In the invention, it is also effective to add a small amount of water to the polymer solution for controlling the solution viscosity and for increasing the wet film strength in drying and further for increasing the dope strength in casting on drum; and for example, the water content may be from 0.1 to 5% by mass of the solution, more preferably from 0.1 to 3% by mass, even more preferably from 0.2 to 2% by mass.

Hereinunder described are preferred examples of a combination of organic solvents that are favorably used as a solvent for the polymer solution to be used in producing the polymer film for use in the production method of the invention, to which, however, the invention should not be limited. The numerical value for the ratio means part by mass.
(1) dichloromethane/methanol/ethanol/butanol=80/10/5/5
(2) dichloromethane/methanol/ethanol/butanol=80/5/5/10
(3) dichloromethane/isobutyl alcohol=90/10
(4) dichloromethane/acetone/methanol/propanol=80/5/5/10

(5) dichloromethane/methanol/butanol/cyclohexane=80/8/10/2
(6) dichloromethane/methyl ethyl ketone/methanol/butanol=80/10/5/5
(7) dichloromethane/butanol=90/10
(8) dichloromethane/acetone/methyl ethyl ketone/ethanol/butanol=68/10/10/7/5
(9) dichloromethane/cyclopentanone/methanol/pentanol=80/2/15/3
(10) dichloromethane/methyl acetate/ethanol/butanol=70/12/15/3
(11) dichloromethane/methyl ethyl ketone/methanol/butanol=80/5/5/10
(12) dichloromethane/methyl ethyl ketone/acetone/methanol/pentanol=50/20/15/5/10
(13) dichloromethane/1,3-dioxolane/methanol/butanol=
(14) dichloromethane/dioxane/acetone/methanol/butanol=75/5/10/5/5
(15) dichloromethane/acetone/cyclopentanone/ethanol/isobutyl alcohol/cyclohexane=60/18/3/10/7/2
(16) dichloromethane/methyl ethyl ketone/acetone/isobutyl alcohol=70/10/10/10
(17) dichloromethane/acetone/ethyl acetate/butanol/hexane=69/10/10/10/1
(18) dichloromethane/methyl acetate/methanol/isobutyl alcohol=65/15/10/10
(19) dichloromethane/cyclopentanone/ethanol/butanol=85/7/3/5
(20) dichloromethane/methanol/butanol=83/15/2
(21) dichloromethane=100
(22) acetone/ethanol/butanol=80/15/5
(23) methyl acetate/acetone/methanol/butanol=75/10/10/5
(24) 1,3-dioxolane=100
(25) dichloromethane/methanol/butanol/water=85/18/1.5/0.5
(26) dichloromethane/acetone/methanol/butanol/water=87/5/5/2.5/0.5
(27) dichloromethane/methanol=92/8
(28) dichloromethane/methanol=90/10
(29) dichloromethane/methanol=87/13
(30) dichloromethane/ethanol=90/10

The details of a case where a non-halogen organic solvent is the main solvent are described in Hatsumei Kyokai Disclosure Bulletin (No. 2001-1745, published by the Hatsumei Kyokai on Mar. 15, 2001), and they may be suitably referred to herein.

(Solution Concentration)

The polymer concentration in the polymer solution to be prepared herein is preferably from 5 to 40% by mass, more preferably from 10 to 30% by mass, most preferably from 15 to 30% by mass.

The polymer concentration may be controlled in such a manner that it could have a predetermined concentration in the stage where polymer is dissolved in solvent. A low-concentration solution (e.g., from 4 to 14% by mass) may be previously prepared, and it may be concentrated by evaporation of the solvent. A high-concentration solution may be prepared, and it may be diluted. When additives are added thereto, the polymer concentration of the solution may also be lowered.

(Additives)

The polymer solution to be used for producing the polymer film for use in the production method of the invention may contain various liquid or solid additives added thereto in each preparation step, in accordance with the application of the film. Examples of the additives are UV absorbent (0.001 to 1% by mass), fine powder having a mean particle size of from 5 to 3000 nm (0.001 to 1% by mass), fluorine-containing surfactant (0.001 to 1% by mass), release agent (0.0001 to 1% by mass), antioxidant (0.0001 to 1% by mass), optical anisotropy controller (0.01 to 10% by mass), IR absorbent (0.001 to 1% by mass).

The optical anisotropy controller is an organic compound having a molecular weight of at most 3000, preferably having both a hydrophobic moiety and a hydrophilic moiety. The compound may change retardation through polymer chain alignment. In addition, when combined with cellulose acylate preferably used in the invention, the compound may increase the hydrophobicity of the film and may reduce the humidity-dependent retardation change thereof. When the film contains the above-mentioned UV absorbent and IR absorbent, then the wavelength-dependent retardation of the film may be effectively controlled. Preferably, the additives to the transparent polymer film of the invention are all substantially free from evaporation during the step of drying the film.

Of the above-mentioned optical anisotropy controllers mentioned above, preferred for use in the invention are those capable of increasing Rth of the un-heat-treated polymer film in accordance with the intended Re and Rth of the heat-treated polymer film. The Rth increase is preferably from 8 to 100 nm, more preferably from 10 to 50 nm, most preferably from 15 to 30 nm. The additive of the type, when added, may selectively increase Rth of the original film (untreated film) prior to processed according to production method of the invention; and therefore when the production method of the invention is applied to the original film containing the additive, then Rth/Re may be increased. For example, a film satisfying both $Rth/Re \geqq -0.39$, and $Re>0$ and $Rth<0$ may be produced.

Depending on the intended Re and Rth, an optical anisotropy controller that does not so much change Rth of the un-heat-treated film or that may lower it may also be favorably used. The Rth change range (Rth of original film with additive −Rth of original film with no additive) is more preferably from −100 to less than 8 nm, even more preferably from −50 to 5 nm, most preferably from −30 to 5 nm. The additive of the type, when added, may improve the mobility of the polymer molecules during heat treatment, and therefore the Re and Rth expressibility of the transparent polymer film produced according to the production method of the invention may be controlled; and accordingly, the heat treatment temperature may be lowered and the Re and Rth ultimate range may be enlarged. Therefore, when an optical anisotropy controller such as retardation enhancer is added to the polymer film to be processed according to the production method of the invention, then not only a transparent polymer film satisfying $|Rth|/Re<0.5$ but also a transparent polymer film satisfying $|Rth|/Re \geqq 0.5$ may be suitably produced.

In the invention, the additive-dependent Rth change range may be indicated by the difference of Rth ($Rth_1$) of the film measured after dipping it in methanol at 25° C., then ultrasonically extracting it for 3 hours and drying it at 80° C. for 10 minutes, and Rth ($Rth_0$) of the film before the methanol treatment, ($Rth_0-Rth_1$). In case where the additive is hardly applicable to methanol extraction, the additive-dependent Rth change range of the film containing it may be indicated the difference of Rth ($Rth_2$) of the un-heat-treated film formed of the additive-containing dope solution, and Rth ($Rth_3$) of the un-heat-treated film formed of the additive-free dope solution, ($Rth_2-Rth_3$).

Concretely, the additive is preferably a compound having at least one aromatic ring, more preferably from 2 to 15 aromatic rings, even more preferably from 3 to 10 aromatic rings. Preferably, the atoms except those in the aromatic ring in the compound are nearly in the configuration of the same plane as that of the aromatic ring; and in case where the compound has plural aromatic rings, it is also desirable that the aromatic rings are also nearly in the configuration of the same plane. For selectively increasing Rth, it is desirable that the additive exists in the film in such a manner that the plane of the aromatic ring thereof is parallel to the direction of the film face.

One or more different types of the additives may be used either singly or as combined.

Concretely, the additive capable of increasing Rth are plasticizers described in JP-A 2005-104148, pp. 33-34; and optical anisotropy controllers described in JP-A 2005-104148, pp. 38-89.

From the viewpoint of reducing the humidity-dependent retardation change of the film, the amount of the additive to be added to the film is preferably larger. However, the increase in the amount of the additive in the film may often cause problems in that the glass transition temperature (Tg) of the polymer film may lower, and the additive may evaporate away during production of the film. Accordingly, when the polymer is cellulose acetate that is preferably used in the invention, then the amount of the additive having a molecular weight of at most 3000 is preferably from 0.01 to 30% by mass of the polymer, more preferably from 2 to 30% by mass, even more preferably from 5 to 20% by mass.

The optical anisotropy controller preferably used for cellulose acylate, which is preferred for the polymer in the invention, is described in JP-A 2005-104148. The UV absorbent is described in JP-A 2001-194522. The time when the additive is added to the polymer may be suitably determined depending on the type of the additive.

(Preparation of Polymer Solution)

The polymer solution may be prepared, for example, according to the methods described in JP-A 58-127737, 61-106628, 2-276830, 4-259511, 5-163301, 9-95544, 10-45950, 10-95854, 11-71463, 11-302388, 11-322946, 11-322947, 11-323017, 2000-53784, 2000-273184, 2000-273239. Concretely, a polymer and a solvent are mixed, stirred and swollen, and optionally cooled or heated to dissolve the polymer, and this is filtered to obtain the polymer solution.

The invention may include cooling and/or heating the mixture of polymer and solvent for the purpose of improving the solubility of the polymer in the solvent.

In case where a halogen-containing organic solvent is used as the solvent and a cellulose acylate as the polymer and when the mixture of polymer and solvent is cooled, it is desirable that the mixture is cooled to −100 to 10° C. Also preferably, the method includes swelling the mixture at −10 to 39° C. prior to the cooling step, and includes heating it at 0 to 39° C. after the cooling step.

In case where a halogen-containing organic solvent is used as the solvent and the mixture of polymer and solvent is heated, it is desirable that method includes dissolving cellulose acylate in the solvent according to at least one process selected from the following (a) or (b):
(a) The mixture is swollen at −10 to 39° C., and the resulting mixture is heated at 0 to 39° C.
(b) The mixture is swollen at −10 to 39° C., then the resulting mixture is heated under 0.2 to 30 MPa and at 40 to 240° C., and the heated mixture is cooled to 0 to 39° C.

In case where a halogen-free organic solvent is used as the solvent and the mixture of cellulose acylate and solvent is cooled, the method preferably includes cooling the mixture to −100 to −10° C. Also preferably, the method includes swelling the mixture at −10 to 55° C. prior to the cooling step, and heating it at 0 to 57° C. after the cooling step.

In case where a halogen-containing organic solvent is used as the solvent and the mixture of polymer and solvent is heated, it is desirable that method includes dissolving cellulose acylate in the solvent according to at least one process selected from the following (c) or (d):
(c) The mixture is swollen at −10 to 55° C., and the resulting mixture is heated at 0 to 57° C.
(d) The mixture is swollen at −10 to 55° C., then the resulting mixture is heated under 0.2 to 30 MPa and at 40 to 240° C., and the heated mixture is cooled to 0 to 57° C.

[Formation of Polymer Film for Use in the Production Method of the Invention]

The polymer film for use in the production method of the invention may be produced according to a solution casting method using the above-mentioned polymer solution. The solution casting method may be attained in any ordinary manner, using an ordinary apparatus. Concretely, a dope (polymer solution) prepared in a dissolver (tank) is filtered, and then it is once stored in a storage tank in which the dope is defoamed to be a final dope. The dope is kept warmed at 30° C., and fed into a pressure die from the dope take-out port, for example, via a pressure meter gear pump via which a predetermined amount of the dope may be accurately fed to the die by controlling the revolution thereof, and then the dope is then uniformly cast onto a metal support in the casting zone that runs endlessly, through the slit of the pressure die (casting step) Next, at the peeling point at which the metal support runs almost one-round, a wet dope film (this may be referred to as a web) is peeled from the metal support, and then transported to a drying zone, in which the web is dried while transported therein by rolls. The details of the casting step and the drying step of the solution casting method are described in JP-A 2005-104148, pp. 120-146, and are suitably applicable to the invention.

The polymer film for use in the production method of the invention may also be produced according to a melt casting method, not using the above-mentioned polymer solution. The melt casting method comprises heating polymer, casting the polymer melt onto a support, and cooling it to form a film. In case where the melting point of the polymer, or the melting point of the mixture of the polymer and various additives thereto is lower than the decomposition temperature thereof and higher than the stretching temperature thereof, the melt casting method is employable. The melt casting method is described, for example, in JP-A 2000-352620.

In the invention, a metal band or a metal drum may be used as the metal support for use in formation of the un-heat-treated polymer film. In case where a transparent polymer film produced by the use of a metal band is used, Rth of the heat-treated film may be low. In that case, though depending on the additives and other retardation-controlling elements, a film having a negative Rth and |Rth|/Re<0.5 may be produced. In case where a transparent polymer film produced by the use of a metal drum is used, Rth of the heat-treated film may be high. In that case, though depending on the additives and other retardation-controlling elements, a film having a nearly zero Rth or a positive Rth and, as the case may be, satisfying |Rth|/Re<0.5 may be produced. The difference in Rth after heat treatment between the polymer films for use in the production method of the invention may be because of the difference in the alignment state of the polymer chains existing in the un-heat-treated films to be caused by the difference in the external force applied to the web in the film-forming step.

In controlling the retardation of the transparent polymer film produced according to the production method of the invention, it is desirable that the mechanical history to be given to the un-heat-treated film, or that is, the external force to be applied to the polymer web during the film formation step is controlled. Concretely, in case where the transparent polymer film produced according to the production method of the invention has a large Re and has negative Rth, the polymer web is stretched preferably by from 0.1% to less than 15%, more preferably from 0.5 to 10%, even more preferably from 1 to 8%. In case where the un-heat-treated polymer film is produced while transported, it is preferably stretched in the film-traveling direction. The residual solvent amount in the polymer web to be stretched is computed according to the following equation, and is from 5 to 1000%. Preferably, the residual solvent amount is from 10 to 200%, more preferably from 30 to 150%, even more preferably from 40 to 100%. Residual Solvent Amount (% by mass)={(M−N)/N}×100 [in the formula, M means the mass of the polymer film just before inserted into the stretching zone; and N means the mass of the polymer film just before inserted into the stretching zone, dried at 110° C. for 3 hours].

In case where the polymer web has a large Re and a positive Rth, it is preferably stretched by from 15 to 300%, more preferably from 18 to 200%, even more preferably from 20 to 100%. In case where the un-heat-treated polymer film is produced while transported, it is preferably stretched in the film-traveling direction. The residual solvent amount in the polymer web to be stretched is computed according to the above equation, and is from 5 to 1000%. Preferably, the residual solvent amount is from 30 to 500%, more preferably from 50 to 300%, even more preferably from 80 to 250%.

The draw ratio (elongation) of the polymer web in stretching may be attained by the peripheral speed difference between the metal support speed and the peeling speed (peeling roll draw). The stretching may control the retardation expressibility of the stretched film.

When the film having a residual solvent amount of at least 5% is stretched, then its haze may be large; but when the film having a residual solvent amount of at most 1000% is stretched, then the external force give to the polymer chains may be readily transmitted thereto and the effect of the retardation expression control by stretching the solvent-containing polymer web may be thereby enhanced. The residual solvent amount in the polymer web may be suitably controlled by changing the concentration of the polymer solution, the temperature and the speed of the metal support, the temperature and the flow rate of the drying air, and the solvent gas concentration in the drying atmosphere.

In the polymer web stretching step, the web surface temperature is preferably lower from the viewpoint of transmitting the external force to the polymer. The web temperature is preferably from (Ts-100) to (Ts-0.1)° C., more preferably from (Ts-50) to (Ts-1)° c., even more preferably from (Ts-20) to (Ts-3)° C. In this, Ts means the surface temperature of the casting support. In case where the temperature of the casting support is so set that it varies in different sites, then Ts indicates the surface temperature of the support center.

Thus stretched, the polymer web is then transported into a drying zone, in which it is clipped with a tenter at both edges, and while transported with rolls, it is dried.

The residual solvent amount in the thus-dried film is preferably from 0 to 2% by mass, more preferably from 0 to 1% by mass. After dried, the film may be transported to a heat-treatment zone, or after the film is once wound up, it may be subjected to off-line heat treatment. Preferably, the transparent polymer film before heat treatment has a width of from 0.5 to 5 m, more preferably from 0.7 to 3 m. In case where the film is once wound up, then the preferred length of the wound film is from 300 to 30000 m, more preferably from 500 to 10000 m, even more preferably from 1000 to 7000 m.

The moisture permeability of the polymer film for use in the production method of the invention is preferably at least 100 g/(m$^2$·day) in terms of the film having a thickness of 80 µm, more preferably from 100 to 1500 g/(m$^2$·day), even more preferably from 200 to 1000 g/(m$^2$·day), still more preferably from 300 to 800 g/(m$^2$·day). In order to produce the film for use in the invention, having a moisture permeability of at least 100 g/(m$^2$·day) in terms of the film having a thickness of 80 µm, it is desirable that the polymer hydrophilicity/hydrophobicity is suitably controlled, or the film density is lowered. For the former method, for example, the hydrophilicity/hydrophobicity of the polymer backbone chain may be suitably controlled, and hydrophobic or hydrophilic side chains may be introduced into the polymer. For the latter method, for example, side chains may be introduced into the polymer backbone chain, or the solvent for use in film formation is suitably selected, or the drying speed in film formation may be controlled.

In the invention, the moisture permeability may be determined as follows: A cup with calcium chloride put therein is covered with the film to be tested and airtightly sealed up therewith, and this is left at 40° C. and 90% RH for 24 hours. From the mass change (g/(m$^2$·day)) before and after the conditioning, the moisture permeability of the film is determined. The moisture permeability increases with the ambient temperature elevation and with the ambient humidity increase, but not depending on the condition, the relationship of the moisture permeability between different films does not change. Accordingly, in the invention, the moisture permeability is based on the mass change at 40° C. and 90% RH. In addition, the moisture permeability lowers with the increase in the film thickness and increases with the reduction in the film thickness. Accordingly, the found data of the moisture permeability is multiplied by the found data of the film thickness, and then divided by 80, and the resulting value is the "moisture permeability in terms of the film having a thickness of 80 µm" in the invention.

[Preliminary Stretching]

The un-heat-treated transparent polymer film, from which the solvent was evaporated away and which has a residual solvent content (computed according to the above equation) of less than 5%, may be preliminary stretched before heat treatment, at a temperature satisfying Tc≦T<Tm$_0$ (hereinafter this stretching is referred to as preliminary stretching). The preliminary stretching may further control the Re and Rth expressibility in the heat-treatment step. Concretely, within the range mentioned below, the stretching temperature is changed and the draw ratio in stretching is increased, whereby the heat-treatment temperature may be set relatively low and the ultimate range of Re and Rth may be enlarged. Not overstepping the sprit and the scope of the invention, any other step may be provided between the preliminary stretching step and the heat treatment step.

In the production method of the invention, it is desirable that the preliminary stretching is attained at from (Tg−20) to (Tg+50)° C. Tg (unit, ° C.) means the glass transition temperature of the polymer film. The preliminary stretching temperature is more preferably from (Tg−10) to (Tg+45)° C., even more preferably from Tg to (Tg+40)° C., most preferably from (Tg+5) to (Tg+35)° C. However, the preliminary stretching temperature should not be higher than the crystallization temperature (Tc) to be mentioned below. Preferably, the preliminary stretching temperature is lower by at least 5°

C. than Tc, more preferably lower by at least 10° C. than Tc, even more preferably lower by at least 15° C., still more preferably lower by at least 20° C., most preferably lower by at least 35° C.

In the invention, the glass transition temperature is the boundary temperature at which the mobility of the polymer that constitutes the transparent polymer film of the invention greatly changes. The glass transition temperature in the invention may be determined as follows: 20 mg of the sample to be analyzed is put into a sample pan for differential scanning calorimetry (DSC), heated in a nitrogen atmosphere at a rate of 10° C./min from 30° C. up to 120° C., kept as such for 15 minutes, and then cooled to 30° C. at a rate of −20° C./min. Then, this is again heated from 30° C. up to 250° C., and the temperature at which the base line of the temperature profile of the sample begins to deviate from the low temperature side is referred to as the glass transition temperature of the sample.

In the production method of the invention, the polymer film is kept at least Tc whereby the structure detected in X-ray diffractiometry may be grown and the retardation of the film may be thereby controlled. In that manner, the film is preliminarily stretched whereby the polymer may be aligned in some degree in the preliminary stretching direction, and therefore in the heat treatment step to be mentioned below, the structure detected by X-ray diffractiometry may be efficiently and anisotropically grown. In addition, when the preliminary stretching temperature is kept lower than the heat treatment temperature, then the polymer may be well aligned with no growth of the structure detected in X-ray diffractiometry, and therefore, in the latter heat treatment step, the structure detected by X-ray diffractiometry may be more efficiently grown. This is an advantage of the method of the invention. Accordingly, it is more desirable that the stretching direction in the preliminary stretching is the same as the stretching direction or the film-traveling direction of the film in the subsequent heat treatment to be mentioned below from the viewpoint of lowering the heat treatment temperature and of enlarging the ultimate range of Re and Rt. Contrary to this, when these directions are not the same, then the ultimate range of Re and Rth may be reduced.

The preliminary stretching direction is not specifically defined. In case where the un-heat-treated polymer film is transported, it may be stretched in the film-traveling direction (machine-direction stretching), or may be stretched in the direction perpendicular to the film-traveling direction (cross-direction stretching). Preferred is machine-direction stretching. For the method of machine-direction stretching and cross-direction stretching and its preferred embodiments, referred to the section of the heat treatment given hereinunder. Preferably, the draw ratio in preliminary stretching is from 1 to 500%, more preferably from 3 to 400%, even more preferably from 5 to 300%, still more preferably from 10 to 100%. The preliminary stretching may be a one-stage process or a multi-stage process. "Draw ratio in preliminary stretching (%)" as referred to herein means the following:

Draw ratio in preliminary stretching (%)=100×{(length after stretching)−(length before stretching)}/(length before stretching).

The pulling speed in the preliminary stretching is preferably from 10 to 10000%/min, more preferably from 20 to 1000%/min, even more preferably from 30 to 800%/min.

[Heat Treatment]

The production method for a transparent polymer film of the invention is characterized by including heat treatment of a transparent polymer film at a temperature T (unit, ° C.) satisfying the following formula (1). In this, the heat treatment is preferably attained while the film is transported.

$$Tc \leq T < Tm_0 \quad (1)$$

In formula (1), Tc means the crystallization temperature (unit, ° C.) of the polymer film before heat treatment, and its unit is ° C. In the invention, the crystallization temperature means a temperature at which the polymer that constitutes the transparent polymer film in the invention form a regular periodic structure. Over the temperature, a structure detectable in X-ray diffractiometry may grow. The crystallization temperature in the invention may be determined as follows: 20 mg of an un-heat-treated film is put into a sample pan for DSC, heated in a nitrogen atmosphere at a rate of 10° C./min from 30° C. up to 120° C., kept as such for 15 minutes, and then cooled to 30° C. at a rate of −20° C./min. Then, this is again heated from 30° C. up to 300° C., and the exothermic peak starting temperature detected in the test is the crystallization temperature of the tested sample. In general, Tc appears on the higher temperature side than the above-mentioned glass transition temperature (Tg). For example, the crystallization temperature of a cellulose triacetate film having a degree of total substitution of 2.85 is about 190° C., though varying depending on the additives thereto and the film formation condition; and the crystallization temperature of a cellulose triacetate film having a degree of total substitution of 2.92 is about 170° C.

In formula (1), $Tm_0$ means the melting point of the polymer film before heat treatment, and its unit is ° C. In the invention, the melting pint may be determined as follows: 20 mg of an un-heat-treated film is put into a sample pan for DSC, heated in a nitrogen atmosphere at a rate of 10° C./min from 30° C. up to 120° C., kept as such for 15 minutes, and then cooled to 30° C. at a rate of −20° C./min. Then, this is again heated from 30° C. up to 300° C., and the endothermic peak starting temperature detected in the test is the melting point of the tested sample. In general, the melting point appears on the higher temperature side than the above-mentioned crystallization temperature (Tc). For example, the melting point of a cellulose triacetate film having a degree of total substitution of 2.85 is about 285° C., though varying depending on the additives thereto and the film formation condition; and the melting point of a cellulose triacetate film having a degree of total substitution of 2.92 is about 290° C.

Heat treatment of the transparent polymer film at the temperature T satisfying the condition of formula (1) may control the retardation expressibility of the film. Accordingly, the invention has made it possible to produce, in a simple method, a transparent polymer film having a retardation value, which has heretofore been difficult to produce. In particular, the invention has made it possible to produce, in a simple method, a transparent polymer film having |Rth|/Re<0.5 and having a good surface condition, which, however, heretofore could be produced only according to a complicated method.

Preferably, the heat treatment temperature in the production method of the invention satisfies the following formula (1-1), more preferably the following formula (1-2), even more preferably the following formula (1-3). Selecting the temperature for the heat treatment that satisfies any of those formulae is advantageous in that the Re expressibility increases and, as the case may be, the stretching direction could be perpendicular to the direction of the slow axis of the heat-treated film.

$$Tc \leq T < Tm_0 - 5 \quad (1\text{-}1)$$

$$Tc \leq T < Tm_0 - 10 \quad (1\text{-}2)$$

$$Tc + 5 \leq T < Tm_0 - 15 \quad (1\text{-}3)$$

When the starting polymer film is stretched at a temperature T that satisfies $Tc \leq T < Tm_0$ according to the production method of the invention, then the mobility of the polymer chains constituting the film may be enhanced and therefore the stretched film may be prevented from being whitened (haze increase) and from being cut owing to the increase in the draw ratio in stretching. In addition, as so mentioned hereinunder, by controlling the pulling speed and the draw ratio in stretching, the balance between the polymer chain aggregation and alignment and the simultaneous thermal relaxation may be well controlled. Therefore, according to the production method of the invention, the aggregation and the alignment of the polymer chains in the film may be promoted to a higher level, and a transparent film having a large modulus of elasticity, a small humidity-dependent dimensional change and a suitable moisture permeability can be produced.

Preferably, in the production method of the invention, the transparent polymer film is heat-treated while transported. The transporting method for the transparent polymer film is not specifically defined. As typical examples, the film may be transported with nip rolls or a suction drum, or may be transported while held with tenter clips (transported while floated by pneumatic pressure). Preferred is the method of transporting the film with nip rolls. Concretely, one embodiment is as follows: At least in the zone before heat treatment, nip rolls are set, and a polymer film to be processed is led to pass between the nip rolls and is thus transported.

The film-traveling speed is generally from 1 to 500 m/min, preferably from 5 to 300 m/min, more preferably from 10 to 200 m/min, even more preferably from 20 to 100 m/min. When the film-traveling speed is at least the above-mentioned lowermost limit, 1 m/min, then the method is favorable as capable of securing a sufficient industrial producibility; and when it is at most the above-mentioned highest limit of 500 m/min, then the method is also favorable for the capability of good crystal growth promotion within a practical heat treatment zone length. When the film-traveling speed is higher, then the film coloration may be prevented more; and when it is lower, the heat treatment zone length may be shorter. Preferably, the film-traveling speed during heat treatment (the device speed of the nip rolls and the suction drum that determines the film-traveling speed) is kept constant.

The heat treatment in the production method of the invention includes, for example, a method of leading a transparent polymer film to run in a zone having a temperature T while transported through it; a method of applying hot air to a transparent polymer film being transported; a method of irradiating a transparent polymer film being transported with heat rays; and a method of contacting a transparent polymer film with a heated roll.

Preferred is the method of leading a transparent polymer film to run in a zone having a temperature T while transported through it. One advantage of the method is that a transparent polymer film may be heated uniformly. The temperature inside the zone may be controlled and kept constant at T by a heater while monitoring with, for example, a temperature sensor. The traveling length of the transparent polymer film running in the zone at a temperature T may vary depending on the property of the transparent polymer film to be produced and on the film-traveling speed; but in general, it is preferably so set that the ratio of (traveling length)/(width of the traveling transparent polymer film) could be from 0.1 to 100, more preferably from 0.5 to 50, even more preferably from 1 to 20. In this description, the ratio may be referred to as an aspect ratio. The film-running time in the zone at a temperature T (heat treatment time) may be generally from 0.01 to 60 minutes, preferably from 0.03 to 10 minutes, more preferably from 0.05 to 5 minutes. Within the range, the retardation expressibility may be excellent and the processed film may be prevented from being colored.

In the production method of the invention, the film may be stretched simultaneously with its heat treatment. The stretching direction in the heat treatment is not specifically defined. When the un-heat-treated polymer film is anisotropic, then it is stretched in the alignment direction of the polymer constituting the film. "Anisotropic film" as referred to herein means that the ratio of the sound wave propagating speed through the film in the direction in which the sound wave propagating speed is the largest to the sound wave propagating speed in the direction perpendicular to the former direction is preferably from 1.01 to 10.0, more preferably from 1.1 to 5.0, even more preferably from 1.2 to 2.5. The sound wave propagating speed in the direction in which the sound wave propagating speed is the largest and that in other directions may be determined as follows: The film to be tested is conditioned at 25° C. and a relative humidity of 60% for 24 hours, and then, using an alignment tester (SST-2500, by Nomura Shoji), the sound wave propagating speed in a direction in which the propagating speed of the longitudinal wave vibration of an ultrasonic pulse is the largest and that in the other directions are determined.

For example, when a transparent polymer film is heat-treated while transported, using an apparatus with a heating zone between two nip rolls, the revolution speed of the nip rolls on the side of the inlet port of the heating zone is set higher than the revolution speed of the nip rolls on the side of the outlet port thereof, whereby the transparent polymer film may be stretched in the film-traveling direction (machine direction). On the other hand, both edges of a transparent polymer film may be held by tenter clips and the film may be led to pass through a heating zone while it is expanded in the direction perpendicular to the film-traveling direction (cross direction), whereby the film may be stretched. Stretching the transparent polymer film being heat-treated in the film-traveling direction makes it possible to well control the retardation expressibility of the film. The draw ratio in stretching in the film-traveling direction may be generally from 0.8 to 100 times, preferably from 1.0 to 10 times, more preferably from 1.2 to 5 times. Stretching the transparent polymer film being heat-treated in the direction perpendicular to the film-traveling direction makes it possible to better the surface property of the transparent polymer film after the heat treatment. The draw ratio in stretching in the direction perpendicular to the film-traveling direction may be generally from 0.8 to 10 times, preferably from 1.0 to 5 times, more preferably from 1.1 to 3 times. The draw ratio in stretching (%) as referred to herein means a value obtained according to the following equation:

Draw Ratio (%)=100×{(length after stretching)−(length before stretching)}/(length before stretching).

The pulling speed is preferably from 10 to 10000%/min, more preferably from 20 to 1000%/min, even more preferably from 30 to 800%/min.

During heat treatment, the transparent polymer film may be shrunk. The shrinking is preferably attained simultaneously with heat treatment. Shrinking the transparent polymer film during heat treatment makes it possible to control the optical properties and/or mechanical properties of the film. The step of shrinking the film in the cross direction may be attained not only simultaneously with heat treatment but also before and/or after heat treatment. The step of shrinking the film in the cross direction may be attained in one stage, or the shrinking step and the stretching step may be repeated. The degree of shrinkage in shrinking the film is preferably from 5 to 80%, more preferably from 10 to 70%, even more preferably from 20 to 60%, most preferably from 25 to 50%. The shrinking direction is not specifically defined. In case where the polymer film before heat treatment is formed while transported, then the film is preferably shrink in the direction perpendicular to the direction in which the film being produced is transported. In case where the film is stretched (for preliminary stretching) prior to shrinking it, the film is shrunk in the direction perpendicular to the direction in which the film is stretched. The degree of shrinkage may be controlled by suitably controlling the heat treatment temperature and/or by controlling the external force given to the film. Concretely, in case where the edges of the film are held by tenter clips, the degree of shrinkage of the film may be controlled by changing the ratio of expansion of the rail-to-rail distance of the tenter. On the other hand, in case where the edges of the film are not fixed but the film is held only by a device for fixing the film in the film-traveling direction, for example, by nip rolls or the like, then the degree of shrinkage of the film may be controlled by controlling the distance of the device that fixes the film in the film-traveling direction, or by changing the tension given to the film, or by changing the quantity of heat given to the film. The degree of shrinkage of the film in the cross direction may be determined from the data of the overall width of the film measured just before and after its shrinkage, according to the following equation.

Degree of shrinkage in cross direction (%)=100×(overall width just before shrinkage−overall width just after shrinkage)/(overall width just before shrinkage).

The heat treatment of the transparent polymer film at a temperature of T may be attained only once or plural times in the production method of the invention. Heat treatment in plural times means that after the previous heat treatment, the film is once cooled to a temperature lower than Tc, and then again heated up to a temperature of from Tc to lower than $Tm_0$, and heat-treated at that temperature while transported. In the heat treatment in plural times, it is desirable that the draw ratio in stretching the film satisfies the above-mentioned range after completion of all the steps of heat treatment. Preferably, in the production method of the invention, the heat treatment is attained at most three times, more preferably at most two times, most preferably at a time.

[Cooling after Heat Treatment]

After heat-treated, the polymer film is cooled to a temperature lower than Tc. The cooling temperature is not specifically defined. Preferably, the film is cooled at a speed of from 100 to 1,000,000° C./min, more preferably from 1,000 to 100,000° C./min, even more preferably from 3,000 to 50,000° C./min. The temperature range for cooling the film at such a cooling speed is preferably at least 50° C., more preferably from 100 to 300° C., even more preferably from 150 to 280° C., still more preferably from 180 to 250° C.

Controlling the cooling speed in that manner makes it possible to well control the retardation expressibility of the obtained transparent polymer film (especially cellulose acylate film). Concretely, when the cooling speed is made high, then the retardation expressibility may be improved. In that case, in addition, the polymer chain alignment distribution in the thickness direction of the cellulose acylate film may be reduced, and the moisture-dependent curl of the film may be prevented. The effect may be attained more favorably when the temperature range of the film cooled at a relatively rapid cooling speed is controlled to fall within the above-mentioned preferred range. As a result, for example, a transparent film (especially cellulose acylate film) satisfying two relational formulae, |Rth|/Re<0.5 and Re≧30 can be obtained. In addition, a transparent polymer film satisfying two relational formulae, |Rth|/Re<0.5 and Re≧60; a transparent polymer film satisfying two relational formulae, |Rth|/Re<0.5 and Re≧100; a transparent polymer film satisfying two relational formulae, |Rth|/Re<0.5 and Re≧150; a transparent polymer film satisfying two relational formulae, |Rth|/Re<0.5 and Re≧200 can also be obtained.

The cooling speed may be controlled by providing a cooling zone held at a temperature lower than that in the heating zone, after the heating zone and transporting the transparent polymer film in those zones in order, or by contacting the film with a cooling roll, or by spraying cold air onto the film, or by dipping the film in a cooled liquid. The cooling speed is not required to be all the time constant during the heating step, but in the initial stage of the cooling step and in the end stage thereof, the cooling speed may be low, while between them the cooling speed may be high. The cooling speed may be determined by measuring the temperature of the film surface at different points by thermocouples disposed on the film surface, as described in Examples given hereinunder.

[Stretching after Heat Treatment]

In the production method of the invention, the transparent polymer film may be subsequently stretched after its heat treatment. The stretching after heat treatment may be attained after the heat-treated transparent polymer film is cooled to a temperature lower than Tc, or may also be attained while the film is kept at the heat treatment temperature but is not cooled. In case where the polymer film is once cooled, then it may be spontaneously left cooled to have a temperature lower than Tc, or may be forcedly cooled to have a temperature lower than Tc. As the case may be, the film once cooled may be again heated up to a temperature lower than Tc. In case where the film is once cooled, the cooling temperature is preferably lower by at least 50° C. than the heat treatment temperature, more preferably lower than it by from 100 to 300° C., even more preferably by from 150 to 250° C. When the cooling temperature is lower by at least 50° C. than the heat treatment temperature, then the ratio Rth/Re of the heat-treated film may be readily controlled. Preferably, the film is once cooled to a cooling temperature, then again heated up to a temperature lower than Tc, and stretched in the condition. The difference between the heat treatment temperature and the stretching temperature is preferably at least 1° C., more preferably from 10 to 200° C., even more preferably from 30 to 150° C., still more preferably from 50 to 100° C. Suitably setting the temperature difference within the range makes it possible to well control the ratio Rth/Re of the processed film. Concretely, when the difference between the heat treatment temperature and the stretching temperature is large, then Rth/Re may increase; but when it is small, then Rth/Re change may be small.

Regarding the stretching method, the methods described in the explanation of stretching during heat treatment may be employed. The stretching may be attained in one stage or in plural stages. Preferred is the above-mentioned method of stretching the film in the film-traveling direction by changing the revolution speed of nip rolls, and the method of stretching it by holding both edges of the polymer film with tenter clips and expanding it in the direction perpendicular to the film-traveling direction. A more preferred embodiment is as follows: The film is not stretched during heat treatment, or is stretched in the film-traveling direction by changing the revolution speed of nip rolls, and then, after the heat treatment, both edges of the heat-treated film are held with tenter clips and expanding it in the direction perpendicular to the film-traveling direction, thereby stretching the film.

The draw ratio in stretching may be suitably defined in accordance with the necessary retardation of the transparent polymer film. Preferably, it is from 1 to 500%, more preferably from 3 to 400%, even more preferably from 5 to 300%, still more preferably from 10 to 100%. The pulling speed is preferably from 10 to 10000%/min, more preferably from 20 to 1000%/min, even more preferably from 30 to 800%/min.

The stretching after the heat treatment may control Re and Rth of the obtained transparent film. For example, when the stretching temperature after the heat treatment is high, then Rth of the film may be lowered not so much changing Re thereof. When the draw ratio in stretching after the heat treatment is high, then Re of the film may be lowered and Rth thereof may be increased. These have a nearly linear relationship, and therefore, suitably selecting the stretching condition after the heat treatment facilitates the production of films having desired Re and Rth.

After the heat treatment, Re and Rth of the transparent polymer film before stretching are not specifically defined.

<<Transparent Polymer Film>>

(Optical Properties of Transparent Polymer Film of the Invention)

According to the production method of the invention, a transparent polymer film having a controlled retardation can be produced. Concretely, according to the production method of the invention, a transparent polymer film having a well-expressed retardation can be obtained. In particular, a transparent polymer film having |Rth|/Re<0.5, which is difficult to produce in conventional methods, can be produced in a relatively simplified manner. |Rth|/Re of the transparent polymer film of the invention is more preferably at most 0.4, even more preferably at most 0.3, still more preferably at most 0.2.

(Retardation)

In this description, Re and Rth (unit, nm) are determined according to the following method. First, the film to be analyzed is conditioned at 25° C. and 60% RH for 24 hours. Then, using a prism coupler (Model 2010 Prism Coupler, by Metricon) at 25° C. and 60% RH, the mean refractive index (n) of the sample, as represented by the following formula (a), is determined with a 532-nm solid laser.

$$n=(n_{TE} \times 2 + n_{TM})/3 \quad (a)$$

wherein $n_{TE}$ is the refractive index measured with polarized light in the direction of the film face; $n_{TM}$ is the refractive index measured with polarizing light in the normal direction to the film face.

In this description, Re($\lambda$) and Rth($\lambda$) each indicate the in-plane retardation and the thickness-direction retardation of a film at a wavelength $\lambda$ (unit, nm). Re ($\lambda$) is determined, using KOBRA 21ADH or WR (by Oji Scientific Instruments), with light having a wavelength of $\lambda$ nm given to a film in the normal direction thereof.

In case where the film to be analyzed is a monoaxial or biaxial index ellipsoid, then its Rth($\lambda$) may be computed as follows:

Re($\lambda$) of the film is determined as follows, with the in-plane slow axis (as judged with KOBRA 21ADH or WR) taken as the tilt angle (rotation angle) (in case where the film does not have a slow axis, any desired in-plane direction of the film may be taken as the rotation axis). An incident light having a wavelength of $\lambda$ nm in applied to the film in the direction tilted from the normal direction of the film at regular intervals of 10° steps within a range of from 50° to +50° from the normal direction thereof, at 11 points in total, and from the found data of the retardation value, the mean refractive index and the film thickness, Rth($\lambda$) is computed by KOBRA 21ADH or WR.

In the above, when no specific description is given to $\lambda$ and when only Re and Rth are shown, the data are with light having a wavelength of 590 nm. For the film having a tilt angle at which the retardation thereof is zero with the in-plane slow axis from the normal direction taken as the rotation axis, its retardation at a tilt angle larger than that tilt angle is converted into the corresponding negative value and then computed by KOBRA 21ADH or WR.

With the slow axis taken as the tilt axis (rotation axis) (in case where the film does not have a slow axis, any desired in-plane direction of the film may be taken as the rotation axis), a retardation is determined in any desired two tilt directions, and based on the found data and the mean refractive index and the inputted film thickness, Rth of the film may also be computed according to the following formulae (b) and (c)

$$Re(\theta) = \left[ nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{2}\right)\right)\right)^2}} \right] \times \frac{d}{\cos\left(\sin^{-1}\left(\frac{\sin(-\theta)}{nx}\right)\right)} \quad (b)$$

wherein Re ($\theta$) means a retardation in the direction tilted by an angle $\theta$ from the normal direction; nx means the refractive index in the in-plane slow axis direction; ny means the refractive index in the direction perpendicular to the in-plane nx; nz means the refractive index in the direction perpendicular to nx and ny; d means the thickness of the film.

$$Rth = ((nx+ny)/2 - nz) \times d \quad (c)$$

In case where the film to be analyzed could not be expressed as a monoaxial or biaxial index ellipsoid, or in case where the film to be analyzed has no optical axis, then its Rth($\lambda$) may be computed as follows:

Re($\lambda$) of the film is determined as follows, with the in-plane slow axis (as judged with KOBRA 21ADH or WR) taken as the tilt angle (rotation angle). An incident light having a wavelength of $\lambda$ nm in applied to the film in the direction tilted from the normal direction of the film at regular intervals of 10° steps within a range of from −50° to +50° from the normal direction thereof, at 11 points in total, and from the found data of the retardation value, the mean refractive index and the film thickness, Rth($\lambda$) is computed by KOBRA 21ADH or WR.

The mean refractive index and the film thickness are inputted therein, and KOBRA 21ADH or WR computes nx, ny and nz. From the computed data nx, ny and nz, Nz is further computed as follows: Nz=(nx−nz)/(nx−ny).

In the invention, the in-plane and thickness-direction retardation at a relative humidity H (unit, %) of a film, Re (H %) and Rth (H %) may be determined as follows: The film is conditioned at 25° C. and a relative humidity of H % for 24 hours, and at 25° C. and the relative humidity H %, the retardation values of the film at a wavelength of 590 nm are determined and computed according to the same method as above.

(Humidity Dependence)

Preferably, the transparent polymer film of the invention has retardation data satisfying the following relational formulae under varying humidity conditions.

$$|Re(10\%)-Re(80\%)|<50, \text{ and}$$

$$|Rth(10\%)-Rth(80\%)|<50.$$

More preferably, they satisfy the following relational formulae:

$$|Re(10\%)-Re(80\%)|<30, \text{ and}$$

$$|Rth(10\%)-Rth(80\%)|<40.$$

Even more preferably, they satisfy the following relational formulae:

$$|Re(10\%)-Re(80\%)|<20, \text{ and}$$

$$|Rth(10\%)-Rth(80\%)|<30.$$

Still more preferably, they satisfy the following relational formulae:

$$|Re(10\%)-Re(80\%)|<10, \text{ and}$$

$$|Rth(10\%)-Rth(80\%)|<15.$$

Also preferably, the retardation data of the transparent polymer film of the invention satisfy the following relational formulae under varying humidity conditions.

$$|Re(10\%)-Re(80\%)|/Re<3, \text{ and}$$

$$|Rth(10\%)-Rth(80\%)|/Rth<3.$$

More preferably, they satisfy the following relational formulae:

$$|Re(10\%)-Re(80\%)|/Re<1, \text{ and}$$

$$|Rth(10\%)-Rth(80\%)|/Rth<1.$$

Even more preferably, they satisfy the following relational formulae:

$$|Re(10\%)-Re(80\%)|/Re<0.5, \text{ and}$$

$$|Rth(10\%)-Rth(80\%)|/Rth<0.7.$$

Still more preferably, they satisfy the following relational formulae:

$$|Re(10\%)-Re(80\%)|/Re<0.2, \text{ and}$$

$$|Rth(10\%)-Rth(80\%)|/Rth<0.4.$$

Controlling the retardation data of the film under varying humidity conditions in the manner as above makes it possible to reduce the retardation change of the film in varying external environments and therefore makes it possible to provide liquid-crystal display devices of high reliability.

(Slow Axis)

Preferably, the transparent polymer film of the invention is such that the angle θ formed by the film-traveling direction in its production and the slow axis of Re of the film is 0±10° or 90±10°, more preferably 0±5° or 90±5°, even more preferably 0±3° or 90±3°, and as the case may be, it is still preferably 0±1° or 90±1°, most preferably 90±1°.

(Film Thickness)

Preferably, the thickness of the transparent polymer film of the invention is from 20 μm to 180 μm, more preferably from 30 μm to 160 μm, even more preferably from 40 μm to 120 μm. When the film thickness is at least 20 μm, then the film is favorable in point of the handlability thereof in working the film into polarizer or the like and of the ability thereof to prevent curling of polarizer. Also preferably, the thickness unevenness of the transparent polymer film of the invention is from 0 to 2% both in the film-traveling direction and in the cross direction, more preferably from 0 to 1.5%, even more preferably from 0 to 1%.

(Moisture Permeability)

The moisture permeability of the transparent polymer film of the invention is preferably at least 100 g/(m²·day) in terms of the film having a thickness of 80 μm. Having the moisture permeability of at least 100 g/(m²·day) in terms of the film having a thickness of 80 μm, the film may be readily stuck to a polarizing film. The moisture permeability in terms of the film having a thickness of 80 μm is more preferably from 100 to 1500 g/(m²·day), even more preferably from 200 to 1000 g/(m²·day), still more preferably from 300 to 800 g/(m²·day).

In case where the transparent polymer film of the invention is used as an outer protective film that is not disposed between a polarizing film and a liquid-crystal cell as in the embodiment described below, the moisture permeability of the transparent polymer film of the invention is preferably less than 500 g/(m²·day) in terms of the film having a thickness of 80 μm, more preferably from 100 to 450 g/(m²·day), even more preferably from 100 to 400 g/(m²·day), most preferably from 150 to 300 g/(m²·day). Within the range, the durability of polarizer to moisture or to wet heat may be improved, and liquid-crystal display devices of high reliability can be provided.

(Constitution of Transparent Polymer Film)

The transparent polymer film of the invention may have a single-layered structure or a multilayered structure, but preferably has a single-layered structure. The "single-layered" film as referred to herein means a one-sheet polymer film but not a laminate film of plural films stuck together. This includes a case of producing a one-sheet polymer film from plural polymer solutions according to a successive casting system or a co-casting system. In this case, the type and the blend ratio of the additives to be used as well as the molecular weight distribution of the polymer to be used and the type of the polymer may be suitably controlled to thereby produce a polymer film having a distribution in the thickness direction thereof. The one-sheet film may comprise various functional parts of an optically-anisotropic part, an antiglare part, a gas-barrier part and a moisture-proof part.

(Surface Treatment)

The transparent polymer film of the invention may be suitably surface-treated so as to improve its adhesion to various functional layers (e.g., undercoat layer, back layer, optically-anisotropic layer). The surface treatment includes glow discharge treatment, UV irradiation treatment, corona treatment, flame treatment, saponification treatment (acid saponification, alkali saponification); and glow discharge treatment and alkali saponification treatment are preferred. The "glow discharge treatment" is a treatment of processing a film surface with plasma in the presence of a plasma-exciting vapor. The details of the surface treatment are described in Hatsumei Kyokai Disclosure Bulletin (No. 2001-1745, published by the Hatsumei Kyokai on Mar. 15, 2001), and may be suitably applied to the invention.

For improving the adhesiveness between the film surface and a functional layer thereon, an undercoat layer (adhesive layer) may be provided on the transparent polymer film of the invention, in addition to the surface treatment or in place of the surface treatment thereof. The undercoat layer is described in Hatsumei Kyokai Disclosure Bulletin (No. 2001-1745, published by the Hatsumei Kyokai on Mar. 15, 2001), p. 32, which may be suitably applied to the invention. The functional layers that may be provided on a cellulose acylate film are described in Hatsumei Kyokai Disclosure Bulletin (No. 2001-1745, published by the Hatsumei Kyokai on Mar. 15, 2001), pp. 32-45, and they may be suitably applied to the transparent polymer film the invention.

<<Retardation Film>>

The transparent polymer film of the invention may be used as a retardation film. "Retardation film" is meant to indicate an optical material having optical anisotropy which is used generally in display devices such as liquid-crystal display devices, and it has the same meaning as that of retardation plate, optical compensatory sheet, optical compensatory film, etc. In a liquid-crystal display device, the retardation film is used for the purpose of increasing the display panel contrast and of improving the viewing angle characteristics and the color of the device.

Using the transparent film of the invention facilitates the production of a retardation film having desired Re and Rth.

A plurality of the transparent polymer films of the invention may be laminated, or the transparent polymer film of the invention may be laminated with any other film not falling within the scope of the invention, thereby controlling Re and Rth of the resulting laminate, and the laminate may be used as a retardation film. The film lamination may be attained by the use of a sticky paste or an adhesive.

As the case may be, the transparent polymer film of the invention may be used as a support of a retardation film, and an optically-anisotropic layer of liquid crystal or the like may be provided on it to construct a retardation film. The optically-anisotropic layer to be applied to the retardation film of the invention may be formed of, for example, a liquid-crystalline compound-containing composition or a birefringent polymer film, or may be formed of the transparent polymer film of the invention.

The liquid-crystalline compound is preferably a discotic liquid-crystalline compound or a rod-shaped liquid-crystalline compound.

[Discotic Liquid-Crystalline Compound]

Examples of discotic liquid-crystalline compounds usable in the invention are described in various documents (e.g., C. Destrade et al., Mol. Cryst. Liq. Cryst., Vol. 71, p. 111 (1981); Quarterly Journal of General Chemistry, edited by the Chemical Society of Japan, No. 22, Chemistry of Liquid Crystal, Chap. 5, Chap. 10, Sec. 2 (1994); B. Kohne et al., Angew. Chem. Soc. Chem. Comm., p. 1794 (1985): J. Zhang et al., J. Am. Chem. Soc., Vol. 116, p. 2655 (1994)).

In the optically-anisotropic layer, the discotic liquid-crystalline molecules are preferably fixed as aligned. Most preferably, the molecules are fixed through polymerization. Polymerization of discotic liquid-crystalline molecules is described in JP-A 8-27284. For fixing the discotic liquid-crystalline molecules through polymerization, the discotic core of the discotic liquid-crystalline molecules must be substituted with a polymerizing group. However, when a polymerizing group is bonded directly to the discotic core, then the molecules could hardly keep their alignment state during polymerization. Accordingly, a linking group is introduced between the discotic core and the polymerizing group. Polymerizing group-having discotic liquid-crystalline molecules are described in JP-A 2001-4387.

[Rod-Shaped Liquid-Crystalline Compound]

Examples of rod-shaped liquid-crystalline compounds usable in the invention are azomethines, azoxy compounds, cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolanes and alkenylcyclohexylbenzonitriles. The rod-shaped liquid-crystalline compound for use herein is not limited to these low-molecular liquid-crystalline compounds but includes polymer liquid-crystalline compounds.

In the optically-anisotropic layer, the rod-shaped liquid-crystalline molecules are preferably fixed as aligned. Most preferably, the molecules are fixed through polymerization. Examples of the polymerizing rod-shaped liquid-crystalline compound usable in the invention are described, for example, in Makromol. Chem., Vol. 190, p. 2255 (1989); Advanced Materials, Vol. 5, p. 107 (1993); U.S. Pat. Nos. 4,683,327, 5,622,648, 5,770,107, WO95/22586, WO95/24455, WO97/00600, WO98/23580, WO98/52905, JP-A 1-272551, 6-16616, 7-110469, 11-80081, 2001-328973.

<<Polarizer>>

The transparent polymer film and the retardation film of the invention may be used as a protective film for polarizer (polarizer of the invention). The polarizer of the invention comprises a polarizing film and two polarizer-protective films that protect both surfaces of the polarizing film, in which the transparent polymer film or the retardation film of the invention is used as at least one polarizer-protective film.

In case where the transparent polymer film of the invention is used as the above-mentioned, polarizer-protective film, it is desirable that the transparent polymer film of the invention is subjected to the above-mentioned surface treatment (as in JP-A 6-94915, 6-118232) for hydrophilicating its surface. For example, the film is preferably processed by glow discharge treatment, corona discharge treatment or alkali saponification. In particular, when the polymer that constituted the transparent polymer film of the invention is cellulose acylate, then alkali saponification is the most preferred for the surface treatment.

The polarizing film for use herein may be prepared by dipping a polyvinyl alcohol film in an iodine solution and stretching it. In case where such a polarizing film prepared by dipping a polyvinyl alcohol film in an iodine solution and stretching it is used, the transparent polymer film of the invention may be directly stuck to both surfaces of the polarizing film with an adhesive, with its surface-treated face being inside of the resulting structure. In the production method of the invention, it is desirable that the transparent polymer film is directly stuck to a polarizing film in that manner. The adhesive may be an aqueous solution of polyvinyl alcohol or polyvinyl acetal (e.g., polyvinyl butyral), or a latex of a vinylic polymer (e.g., polybutyl acrylate). An aqueous solution of a completely-saponified polyvinyl alcohol is especially preferred for the adhesive.

In a liquid-crystal display device, in general, a liquid-crystal cell is provided between two polarizers. The device therefore has four polarizer-protective films. The transparent polymer film of the invention may be applied to any of those four polarizer-protective films, but preferably it is used especially advantageously as the protective film to be disposed between the polarizing film and the liquid-crystal layer (liquid-crystal cell) in the liquid-crystal display device. The protective film to be disposed on the opposite side to the transparent polymer film of the invention with a polarizing film sandwiched therebetween may be provided with a transparent hard coat layer, an antiglare layer, an antireflection layer or the like. In particular, the transparent polymer film of the invention is favorably used as a polarizer-protective film of the outermost surface on the display side of liquid-crystal display device.

<<Liquid-Crystal Display Device>>

The transparent polymer film, the retardation film and the polarizer of the invention may be used in liquid-crystal display devices of various display modes. Various liquid-crystal modes in which the film is used are described below. Of those modes, the transparent polymer film, the retardation film and the polarizer of the invention are especially favorably used in VA-mode and IPS-mode liquid-crystal display devices. The liquid-crystal display devices may be any of transmission-type, reflection-type or semitransmission-type ones.

(TN-Mode Liquid-Crystal Display Device)

The transparent polymer film of the invention may be used as a support of the retardation film in a TN-mode liquid-crystal display device having a TN-mode liquid-crystal cell. TN-mode liquid-crystal cells and TN-mode liquid-crystal display devices are well known from the past. The retardation film for use in TN-mode liquid-crystal display devices is described in JP-A 3-9325, 6-148429, 8-50206, 9-26572; and in Mori et al's reports (Jpn. J. Appl. Phys., Vol. 36 (1997), p. 143; Jpn. J. Appl. Phys., Vol. 36 (1997), p. 1068).

(STN-Mode Liquid-Crystal Display Device)

The transparent polymer film of the invention may be used as a support of the retardation film in an STN-mode liquid-crystal display device having an STN-mode liquid-crystal cell. In an STN-mode liquid-crystal display device, in general, the rod-shaped liquid-crystalline molecules in the liquid-crystal cell are twisted within a range of from 90 to 360 degrees, and the product ($\Delta nd$) of the refractivity anisotropy ($\Delta n$) of the rod-shaped liquid-crystalline molecules and the cell gap (d) falls within a range of from 300 to 1500 nm. Retardation films for use in STN-mode liquid-crystal display devices are described in JP-A 2000-105316.

(VA-Mode Liquid-Crystal Display Device)

The transparent polymer film of the invention may be used as the retardation film or as a support of the retardation film in a VA-mode liquid-crystal display device having a VA-mode liquid-crystal cell. The VA-mode liquid-crystal display device may be a domain-division system device, for example, as in JP-A 10-123576. The polarizer with the transparent polymer film of the invention in these embodiments contributes toward viewing angel expansion and contract improvement.

(IPS-Mode Liquid-Crystal Display Device and ECB-Mode Liquid-Crystal Display Device)

The transparent polymer film of the invention is especially advantageously used as the retardation film, as a support of the retardation film or as a protective film of the polarizer in an IPS-mode liquid-crystal display device and an ECB-mode liquid-crystal display device having an IPS-mode or ECB-mode liquid-crystal cell. In these modes, the liquid-crystal material is aligned nearly in parallel to each other at the time of black level of display, and under a condition of no voltage application thereto, the liquid-crystalline molecules are aligned in parallel to the substrate face to give black display. In these embodiments, the polarizer with the transparent polymer film of the invention contributes toward viewing angel expansion and contract improvement.

(OCB-Mode Liquid-Crystal Display Device and HAN-Mode Liquid-Crystal Display Device)

The transparent polymer film of the invention is advantageously used as a support of the retardation film in an OCB-mode liquid-crystal cell-having OCB-mode liquid-crystal display device or a HAN-mode liquid-crystal cell-having HAN-mode liquid-crystal display device. It is desirable that, in the retardation film in an OCB-mode liquid-crystal display device and a HAN-mode liquid-crystal display device, the direction in which the absolute value of the retardation of the film is the smallest is neither the in-plane direction nor the normal direction of the retardation film. The optical properties of the retardation film for use in an OCB-mode liquid-crystal display device or a HAN-mode liquid-crystal display device depend on the optical properties of the optically-anisotropic layer, the optical properties of the support and the configuration of the optically-anisotropic layer and the support of the film. Retardation films for use in an OCB-mode liquid-crystal display device and a HAN-mode liquid-crystal display device are described in JP-A 9-197397. In addition, they are also described in Mori et al's report (Jpn. J. Appl. Phys., Vol. 38 (1999), p. 2834).

(Reflection-Type Liquid-Crystal Display Device)

The transparent polymer film of the invention may be advantageously used as the retardation film of TN-mode, STN-mode, HAN-mode or GH (guest-host)-mode reflection-type liquid-crystal display devices. These display modes are well known from the past. TN-mode reflection-type liquid-crystal display devices are described in JP-A 10-123478, WO98/48320, Japanese Patent 3022477. Retardation films for use in reflection-type liquid-crystal display devices are described in WO00/65384.

(Other Liquid-Crystal Display Devices)

The transparent polymer film of the invention may be advantageously used as a support of the retardation film in an ASM (axially symmetric aligned microcell)-mode liquid-crystal cell-having ASM-mode liquid-crystal display device. The ASM-mode liquid-crystal cell is characterized in that the cell thickness is held by a position-controllable resin spacer. The other properties of the cell are the same as those of the TN-mode liquid-crystal cell. ASM-mode liquid-crystal cells and ASM-mode liquid-crystal display devices are described in Kume et al's report (Kume et al., SID 98 Digest 1089 (1998)).

(Hard Coat Film, Antiglare Film, Antireflection Film)

As the case may be, the transparent polymer film of the invention may be applied to a hard coat film, an antiglare film and an antireflection film. For the purpose of improving the visibility of LCD, PDP, CRT, EL and the like flat panel displays, any or all of a hard coat layer, an antiglare layer and an antireflection layer may be given to one face or both faces of the transparent polymer film of the invention. Preferred embodiments of such antiglare films and antireflection films are described in detail in Hatsumei Kyokai Disclosure Bulletin (No. 2001-1745, published by the Hatsumei Kyokai on Mar. 15, 2001), pp. 54-57, and these are also preferred for the transparent polymer film of the invention.

EXAMPLES

Measurement Methods

Measurement methods and evaluation methods for the properties used in the following Examples are described below.

[Degree of Substitution]

The degree of acyl substitution of cellulose acylate is determined through $^{13}$C-NMR, according to the method described in Carbohydr. Res. 273 (1995), 83-91 (Tezuka, et al.).

[Retardation]

The film to be tested is sampled at five points in the cross direction thereof (center, and both edges (at the position of 5% of the overall width from both edges), and two intermediates between the center and the edge) at intervals of 100 m in the machine direction, thereby giving samples having a size of 2 cm×2 cm. These samples are tested according to the method mentioned above. The retardation data of every point are averaged to be Re, Rth, Re (10%), Re (80%), Rth (10%) and Rth (80%); and according to the following formulae (VIII) and (IX), ΔRe and ΔRth are computed. Further, ΔRe/RE and ΔRth/Rth are also computed.

$$\Delta Re = |Re(10\%) - Re(80\%)| \qquad \text{(VIII)}$$

$$\Delta Rth = |Rth(10\%) - Rth(80\%)| \qquad \text{(IX)}$$

The difference between the maximum value and the minimum value of the shifted slow axis direction at every point from the film-traveling direction and from the direction perpendicular to it (unit, °—the data may fall between −45 and +45°) is computed, and this is the fluctuation width of the slow axis direction.

[Slow Axis Shift]

The film to be tested is sampled in the same manner as that for the above-mentioned retardation determination. The difference between the maximum value and the minimum value of the slow axis shift (unit, °—the data may fall between −45 and +45°) in each sample from the film-traveling direction or from the direction perpendicular to it is computed, and this is the slow axis shift.

[Glass Transition Temperature (Tg)]

20 mg of an un-heat-treated polymer film is put into a sample pan for DSC, heated in a nitrogen atmosphere at a rate of 10° C./min from 30° C. up to 120° C., kept as such for 15 minutes, and then cooled to 30° C. at a rate of −20° C./min. Then, this is again heated from 30° C. up to 250° C., and the temperature at which the base line of the temperature profile of the sample begins to deviate from the low-temperature side is referred to as Tg of the un-heat-treated polymer film.

[$Tm_0$]

20 mg of an un-heat-treated polymer film is put into a sample pan for DSC, heated in a nitrogen atmosphere at a rate of 10° C./min from 30° C. up to 120° C., kept as such for 15 minutes, and then cooled to 30° C. at a rate of −20° C./min. Then, this is again heated from 30° C. up to 300° C., and the endothermic peak starting temperature detected in the test is $Tm_0$ of the un-heat-treated polymer film.

[Tc]

20 mg of an un-heat-treated polymer film is put into a sample pan for DSC, heated in a nitrogen atmosphere at a rate of 10° C./min from 30° C. up to 120° C., kept as such for 15 minutes, and then cooled to 30° C. at a rate of −20° C./min. Then, this is again heated from 30° C. up to 300° C., and the exothermic peak starting temperature detected in the test is Tc of the un-heat-treated polymer film.

[Degree of Polymerization]

A produced cellulose acylate is absolutely dried, then about 0.2 g of it is accurately taken and dissolved in 100 mL of a mixed solvent of dichloromethane/ethanol=9/1 (by mass). Using an Ostwald viscometer, the time taken for its dropping at 25° C. is counted, and the degree of polymerization DP of the sample is computed according to the following formulae:

$$\eta rel = T/T_0$$

$$[\eta] = \ln(\eta rel)/C$$

$$DP = [\eta]/Km$$

wherein T means the dropping time (sec) of the test sample; $T_0$ means the dropping time (sec) of the solvent alone; ln means a natural logarithmic number; C means the sample concentration (g/L); and Km is $6 \times 10^{-4}$.

[Degree of Polarization]

Produced two polarizers are stacked up with their absorption axes kept in parallel to each other, and the transmittance (Tp) is measured. They are stacked up with their absorption axes kept vertical to each other, and the transmittance (Tc) is measured. The degree of polarization (P), as represented by the following formula, is computed.

$$\text{Degree of Polarization } P = ((Tp - Tc)/(Tp + Tc))^{0.5}$$

[Moisture Permeability]

In the invention, the moisture permeability is determined as follows: A cup with calcium chloride put therein is covered with the film to be tested and airtightly sealed up therewith, and this is left at 40° C. and 90% RH for 24 hours. From the mass change (g/(m²·day)) before and after the conditioning, the moisture permeability of the film is determined.

[Film Surface Condition]

The surface of the transparent polymer film to be analyzed is visually checked, and the surface condition thereof is evaluated according to the criteria mentioned below.

A: Its surface condition is good, and the film is favorable for optical use.
B: The film looks somewhat wavy, but is favorable for optical use.
C: The film is wavy in a relatively large area thereof, or is partly whitened, and the film is unsuitable for optical use.
D: The film is extremely wavy or its entire surface is whitened, and the film is unsuitable for optical use.

[Haze]

The film to be tested is sampled at five points in the cross direction thereof (center, and both edges (at the position of 5% of the overall width from both edges), and two intermediates between the center and the edge), and these are tested according to the method mentioned above. The data of every point are averaged, and the resulting mean value indicates the haze of the film.

The invention is described in more detail with reference to the following Examples and Comparative Examples. In the following Examples, the material used, its amount and the ratio, the details of the treatment and the treatment process may be suitably modified or changed not overstepping the sprit and the scope of the invention. Accordingly, the invention should not be limitatively interpreted by the Examples mentioned below.

Production Example 1

Production of Cellulose Acetate Propionate (CAP SY-1)

150 g of cellulose (hardwood pulp) and 75 g of acetic acid were taken in a reactor, 5-liter separable flask equipped with a refluxer, and vigorously stirred for 2 hours with heating in an oil bath kept at 60° C. Thus pretreated, the cellulose was swollen and pulverized to be fluffy. The reactor was put in an iced water bath at 2° C. for 30 minutes and cooled.

Separately, a mixture of 1545 g of propionic anhydride and 10.5 g of sulfuric acid was prepared as an acylating agent, cooled to −30° C., and then added all at a time to the reactor containing the above pre-treated cellulose. After 30 minutes, the external temperature was gradually elevated in order that the inner temperature could be 25° C. in 2 hours after the addition of the acylating agent. The reactor was cooled in an iced water bath at 5° C. so that the inner temperature could be 10° C. in 0.5 hours after the addition of the acylating agent and could be 23° C. in 2 hours after it; and then while the inner temperature was kept at 23° C., this was further stirred for 3 hours. The reactor was cooled in an iced water bath at 5° C., and 120 g of 25 mas. % acetic acid water cooled at 5° C. was added to it, taking 1 hour. The inner temperature was elevated up to 40° C., and this was then stirred for 1.5 hours. Next, a solution prepared by dissolving magnesium acetate tetrahydrate in 50 mas. % acetic acid water in an amount of 2 times by mol of sulfuric acid was added to the reactor, and stirred for 30 minutes. 1 L of 25 mas. % acetic acid water, 500 mL of 33 mas. % acetic acid water, 1 L of 50 mas. % acetic acid water, and 1 L of water were added to it in that order, and cellulose acetate propionate was thereby precipitated. The formed cellulose acetate propionate precipitate was washed with hot water. When the washing condition is varied in this stage, then cellulose acetate propionate (CAP SY-1) having a varying residual sulfuric acid radical amount may be obtained. After washed, this was stirred in an aqueous solution of 0.003 mas. % calcium hydroxide and 0.01 mas. % magnesium sulfate at 20° C. for 0.5 hours, and then washed in water until the pH of the wash waste could reach 7; and thereafter this was dried in vacuum at 70° C.

$^1$H-NMR and GPC confirmed that the obtained cellulose acetate propionate had a degree of acetylation of 0.30, a degree of propionylation of 2.63 and a degree of polymerization of 320. The sulfuric acid radical content was determined according to ASTM D-817-96. CAP SY-1 had a residual acetic acid amount of at most 0.05% by mass, a Ca content of 18 ppm, an Mg content of 32 ppm, an Fe content of 0.02 ppm, a free propionic acid content of 15 ppm, and an S content of 25 ppm. The degree of 6-acetyl substitution in the cellulose product was 0.11, and this was 37% of all acetyl groups therein. The cellulose product had a ratio of weight-average molecular weight/number-average molecular weight of 2.2.

Production Example 2

Production of Cellulose Acetate Butyrate 100 g of cellulose (hardwood pulp) and 135 g of acetic acid were taken in a reactor, 5-liter separable flask equipped with a refluxer, and kept heated in an oil bath at 60° C. for 1 hour. Next, while heated in the oil bath at 60° C., this was vigorously stirred for 1 hour. Thus pretreated, the cellulose was swollen and pulverized to be fluffy. The reactor was put in an iced water bath at 5° C. for 1 hour, and the cellulose was thus fully cooled.

Separately, a mixture of 1080 g of butyric anhydride and 10.0 g of sulfuric acid was prepared as an acylating agent, cooled to −20° C., and then added all at a time to the reactor containing the above pre-treated cellulose. After 30 minutes, the external temperature was elevated up to 20° C., and this was reacted for 5 hours. The reactor was cooled in an iced water bath at 5° C., and 2400 g of 12.5 mas. % acetic acid water cooled at about 5° C. was added to it, taking 1 hour. The inner temperature was elevated up to 40° C., and this was then stirred for 1 hour. Next, 100 g of an aqueous solution of 50 mas. % magnesium acetate tetrahydrate was added to the reactor, and stirred for 30 minutes. 1000 g of acetic acid and 2500 g of 50 mas. % acetic acid water were gradually added to it, and cellulose acetate butyrate was thereby precipitated. The formed cellulose acetate butyrate precipitate was washed with hot water. When the washing condition is varied in this stage, then cellulose acetate butyrate having a varying residual sulfuric acid radical amount may be obtained. After washed, this was stirred in an aqueous solution of 0.005 mas. % calcium hydroxide for 0.5 hours, and then washed in water until the pH of the wash waste could reach 7; and thereafter this was dried at 70° C. The obtained cellulose acetate butyrate had a degree of acetylation of 0.84, a degree of butyrylation of 2.12 and a degree of polymerization of 268.

Example 1

Production and Evaluation of Transparent Polymer Film

<<Films 101 to 120>>
1) Preparation of Polymer Solution:
(1-1) Polymer and Additive:
With reference to the above-mentioned Production Examples, polymers having a different degree of polymerization as in Table 1 were produced; and these polymers were used in producing films. The polymer was heated at 120° C. and dried to have a water content of at most 0.5% by mass. 17.5 parts by mass of the polymer was used, and silicon dioxide fine particles (particle size, 20 nm; Mohs hardness, about 7) (0.08 parts by mass) were added thereto. In the film production, the plasticizer shown in Table 1 was added in the amount thereof also shown in Table 1 (in terms of % by mass relative to the polymer).
(1-2) Solvent:
In the film production, a mixed solvent of dichloromethane/methanol/butanol (83/15/2 parts by mass) was used. The water content of the solvent was at most 0.2% by mass each.
(1-3) Preparation of Polymer Solution (Hereinafter this May be Referred to as Dope):
The above-mentioned plural solvents were mixed in a 4000-liter stainless dissolution tank having a stirring blade to prepare a mixed solvent. With well stirring and dispersing, the above-mentioned polymer flakes (CAP SY-1) were gradually added to it to make 2000 kg in all. The constitutive solvents all had a water content of at most 0.5% by mass. The polymer powder was put into a dispersion tank, and dispersed therein for 30 minutes, with the eccentric stirring axis of the dissolver kept rotated at a peripheral speed of 5 m/sec (shear stress, $5 \times 10^4$ kgf/m/sec$^2$) and with the shaft having an anchor blade at the center axis kept rotated at a peripheral speed of 1 m/sec (shear stress, $1 \times 10^4$ kgf/m/sec$^2$). At the start of dispersion, the temperature was 20° C., and the final ultimate temperature was 35° C. After the dispersion, the rapid stirring was stopped, and this was further stirred for 100 minutes with the peripheral speed of the anchor blade kept at 0.5 m/sec, and the polymer flakes were thus swollen. The tank was kept pressurized at 0.12 MPa with nitrogen gas until the end of the swelling. The oxygen concentration in the tank in this stage was less than 2 vol. %, and the tank was kept on the level with no danger of explosion. The water content of the dope was confirmed to be not higher than 0.5% by mass (this was 0.3% by mass).
(1-4) Dissolution and Filtration Step:
The swollen solution was heated up to 50° C. from the tank with a jacketed pipe, and then further heated up to 90° C. under a pressure of 1.2 MPa, whereby this was completely dissolved. The heating time was 15 minutes. Next, the temperature was lowered to 36° C., and then this was applied to a filter having a nominal pore size of 8 µm to prepare a dope. In this stage, the primary pressure in filtration was 1.3 MPa, and the secondary pressure was 1.0 MPa. The filter, the housing and the pipe member exposed to high temperature were all made of an alloy Hastelloy® of good corrosion resistance, and these were protected with a jacket for heat-insulating hot medium circulation.

(1-5) Concentration, Filtration:

Thus obtained, the unconcentrated dope was flushed in a normal pressure tank at 80° C., and the evaporated solvent was separated and collected with a condenser. After thus flushed, the solid concentration in the dope was 24.8% by mass. The concentrated solvent was recovered the recovery step in order that it could be reused as the solvent in the dope preparation step. (The recovery is attained in a distillation step and a dewatering step). In the flush tank, the shaft having an anchor blade at the center axis was rotated at a peripheral speed of 0.5 m/sec, whereby the dope was stirred and defoamed. The dope temperature in the tank was 25° C., and the mean residence time in the tank was 50 minutes.

Next, the dope was irradiated with weak ultrasonic waves for degassing. Afterwards, while was kept pressurized at 1.3 MPa, this was applied first to a sintered fiber metal filter having a nominal pore size of 10 µm and then to a sintered fiber filter having a nominal pore size of 10 µm. In the filtration, the primary pressure was 1.4 MPa and 1.1 MPa; and the secondary pressure was 1.0 MPa and 0.7 MPa. After the filtration, the dope temperature was controlled to be 36° C., and stored in a 2000-liter stainless stock tank. In the stock tank, the shaft having an anchor blade at the center axis was all the time kept rotated at a peripheral speed of 0.3 m/sec, and the dope was kept stirred. In producing the dope from the unconcentrated dope, there was no problem of corrosion at the dope contact part of the tank.

2) Film Formation:

(2-1) Casting Step:

Next, the dope in the stock tank was fed with feedback control by the inverter motor under the condition that the primary pressure of the precision gear pump could be 0.8 MPa by the action of the primary pressurization gear pump. Regarding its performance, the precision gear pump had a capacity efficiency of 99.3% and a pumping fluctuation of at most 0.4%. The pumping pressure was 1.4 MPa.

The casting die was equipped with a feed block designed for co-casting and having a width of 2.5 m; and a main stream and upper and lower streams could be cast through it to give a three-layered laminate film. In the following description, the layer formed of the main stream is referred to as an interlayer; and the layer on the side of the support face is referred to as a support-side layer and the layer on the opposite side is referred to as an air-side layer. The dope feed pathways were three pathways for the interlayer, the support-side layer and the air-side layer. In the production of the film, only the pathway for interlayer was used.

In order that the finished polymer film could have a thickness of 80 µm, the casting width was 2200 mm and the polymer dope was cast with controlling the flow rate thereof at the die slit. In order to control the dope temperature at 36° C., the casting die was protected with a jacket and the inlet temperature of the heat medium to be supplied to the jacket was 36° C.

During the process, the die, the feed block and the pipe were all kept at 36° C. The die is a hanger-type die, having thickness controlling bolts disposed at intervals of 20 mm, and this is provided with a heat bolt-type automatic thickness controlling mechanism. The heat bolt enables profile settlement in accordance with the feed rate of the precision gear pump by a preset program, and for its performance, this enables feedback control by the control program based on the profile of the IR ray thickness gauge disposed inside the film formation system. The film formation process was so controlled that the thickness difference between two points spaced by 50 mm in the produced film, after trimmed at the casting edges of 20 mm, could be at most 1 µm and that the largest difference in the minimum value of the thickness in the cross direction could be at most 2 µm/m. On the primary side of the die, disposed was a chamber for pressure reduction. The degree of pressure reduction by the pressure reduction chamber is so designed that the chamber could impart a pressure difference of from 1 Pa to 5000 Pa before and after the casting bead, and the pressure reduction can be controlled in accordance with the casting speed. In this, the pressure difference was such that the bead length could be from 2 mm to 50 mm.

(2-2) Casting Die:

For the material of the die, used was two-phase stainless steel having a mixed composition of an austenite phase and a ferrite phase. This has a thermal expansion coefficient of at most $2 \times 10^{-5}$ (° $C.^{-1}$); and in a forced corrosion test in an aqueous electrolytic solution, its anticorrosion property was nearly on the same level as that of SUS316. Regarding the finishing accuracy of the liquid-contact face of the casting die and the feed block, the surface roughness is at most 1 µm, the straightness is at most 1 µm/m in every direction, the slit clearance is automatically controllable within a range of from 0.5 mm to 3.5 mm. In this Example of film formation, the slit clearance was 1.5 mm. The corner part of the liquid-contact part at the tip of the die lip was so worked that R could be at most 50 µm throughout the entire width of the slit. The shear speed inside the die was within a range of from 1 ($sec^{-1}$) to 5000 ($sec^{-1}$).

The casting die has a hardened film at the tip of its lip. The film may be formed of tungsten carbide (WC), $Al_2O_3$, TiN, $Cr_2O_3$ or the like, especially preferably WC. In the invention, the lip tip was coated with WC by a melt spraying method. A dope-solubilizing mixed solvent (dichloromethane/methanol/butanol=83/15/2 by mass) was applied to the vapor-liquid interface at the bead edge and the slip at a rate of 0.5 ml/min. Further, in order to keep the temperature of the reduced pressure chamber constant, a jacket was fitted to it and a heating medium controlled at 35° C. was supplied into it. The edge suction rate is kept controllable within a range of from 1 L/min to 100 L/min. In film production in this Example, this was suitably controlled within a range of from 30 L/min to 40 L/min.

(2-3) Metal Support:

As the support, sued was a stainless endless band having a width of 2.8 m and a length of 100 m. The thickness of the band was 1.5 mm, the surface thereof was polished to have a surface roughness of at most 0.05 µm. Its material was SUS316, having sufficient corrosion resistance and strength. The thickness unevenness of the entire band was at most 0.5%. The band was driven by two drums, and the band tension was controlled to be $1.5 \times 10^4$ kg/m. The relative speed difference between the band and the drums was at most 0.01 m/min. The band driving speed fluctuation was at most 0.5%. The band motion was controlled by detecting the position of both edges thereof so that its meandering in the cross direction could be limited to at most 1.5 mm/rotation. The position fluctuation to be caused by the drum rotation in the vertical direction of the support surface just below the casting die was limited to at most 200 µm. The support is disposed in a casing provided with an air pressure vibration-preventing unit. The dope was cast onto the support through the die. The surface temperature of the center part of the support just before dope casting thereonto was 15° C. The temperature difference from both edges was at most 6° C. The metal support should not have surface defects. The support used herein had no pin holes larger than 30 µm, having pin holes of from 10 µm to 30 µm in an amount of at most 1/m² and pin holes smaller than 10 µm in an amount of at most 2/m².

(2-4) Casting Drying:

The temperature of the casting chamber having the casting die and the support disposed therein was kept at 35° C. The dope cast on the band was first dried with drying air running in parallel to it. The overall heat transfer coefficient from the drying air to the dope in drying it was 24 kcal/m²·hr·° C. The drying air temperature was 130° C. on the upstream side above the band and was 135° C. on the downstream side. Below the band, the temperature was 65° C. The gas saturation temperature was around −8° C. The oxygen concentration in the drying atmosphere on the support was kept at 5% by volume. In order to keep the oxygen concentration at 5% by volume, air was purged with nitrogen gas. In order to condense and recover the solvent in the casting chamber, a condenser was provided, and its outlet port temperature was set at −10° C.

For 5 seconds after the casting, the dope was protected from direct contact with the drying air by an air-shielding unit and the static pressure fluctuation around the casting die was controlled to be within ±1 Pa. At the time when the solvent ratio in the dope reached 45% by mass as dry base, the film was peeled away from the casting support. In this stage, the peeling tension was 8 kgf/m, and the peeling speed relative to the support speed (peeling roll draw) was controlled within a range of from 100.1% to 110% for good film peeling. The peeled film surface temperature was 14° C. The drying speed on the support was 62% by mass (dry-base solvent)/min on average. The solvent gas generated by drying was led into a condenser unit, in which this was liquefied at −10° C. and recovered, and reused as a solvent for film formation. The dry air from which the solvent had been removed was again heated, and was used as the dry air in the dope drying process. In this stage, the water content of the recovered solvent was controlled to be at most 0.5% for its reuse.

The peeled film was transported through a transfer zone with a large number of rollers provided therein. The transfer zone was provided with 3 rollers, and the temperature of the transfer zone was kept at 40° C. While the film was transported with the rollers in the transfer zone, a tension of from 16 N to 160 N was given thereto.

(2-5) Conditions in Tenter Transportation/Drying Step:

The peeled film was transported in a drying zone of a tenter, with its both edges being fixed with tenter clips, and was thus dried with drying air therein. A cooling medium at 20° C. was supplied to the clips to cool the film. The tenter was driven by chain, and the sprocket speed fluctuation was at most 0.5%. The tenter was partitioned into 3 zones, and the drying air temperature in each zone was 90° C., 100° C. and 110° C. in that order from the upstream side. Regarding its vapor composition, the drying air had a saturation vapor concentration at −10° C. The mean drying speed in the tenter was 120% by mass (dry base solvent)/min. The drying may be so controlled that the residual solvent amount in the film at the outlet port of the tenter could be at most 10% by mass. In film production of this Example, the drying zone condition was so controlled that the residual solvent amount could be 7% by mass. In the tenter, the film was stretched also in the cross direction while transported. In the tenter, the expansion in the cross direction of the film was 103% based on the width 100% of the original film led into the tenter. The draw ratio from the peeling roller to the tenter inlet port (tenter driving draw) was 102%. Regarding the draw ratio in the tenter, the substantial draw ratio difference at the site spaced by at least 10 mm from the tenter gear start was at most 10%, and the draw ratio difference between two points spaced by 20 mm was at most 5%. The ratio of the length fixed with the tenter at the base end was 90%. The tenter clips were cooled so as not to be at a temperature higher than 50° C., and the film was transported in that condition. The solvent evaporated in the tenter was condensed and liquefied at −10° C. and recovered. A condenser was provided for solvent condensation and recovery, and its outlet port temperature was set at −8° C. The water content of the recovered solvent was controlled to be at most 0.5% by mass for reusing it.

Within 30 seconds from the tenter outlet port, the film was trimmed at both edges thereof. Using an NT cutter, both edges of the film were trimmed away by 50 mm. The oxygen concentration in the drying air in the tenter was kept at 5% by volume. For keeping the oxygen concentration at 5% by volume, the drying air was purged with nitrogen gas. Before the film is dried at a high temperature in the roller transportation zone to be mentioned hereinunder, it was pre-dried in a pre-drying zone with drying air at 100° C. supplied thereinto.

(2-6) Condition in Post-Drying Step:

The trimmed polymer film thus produced according to the above-mentioned method was dried at a high temperature in a roller transportation zone. The roller transportation zone was partitioned into four sections, and drying air at 120° C., 130° C., 130° C. and 130° C. was fed into those sections in that order from the upstream side. In this stage, the roller tension for film transportation was 100 N/width; and the film was dried for about 10 minutes until the residual solvent amount in the film could reach finally 0.3% by mass. The roller lap angle was 90 degrees and 180 degrees. The material of the roller was aluminium or carbon steel, and the surface thereof was plated with a hard chromium plate layer. Regarding the surface profile thereof, the roller may be flat or may be matted by blasting. The roller vibration by rotation was all at most 50 μm. The roller deformation under tension of 100 N/width was designed to be at most 0.5 mm.

A forced discharge unit (discharge bar) was disposed in the process in order that film charge voltage during transportation could be all the time within a range of from −3 kV to 3 kV. In the winding area, not only the discharge bar but also an ion air discharge unit was also disposed in order that the charge voltage could be from −1.5 kV to 1.5 kV.

The dried film was transported into a first conditioning chamber. In the transfer zone between the roller transportation zone and the first conditioning chamber, dry air at 110° C. was supplied. In the first conditioning chamber, air at a temperature of 50° C. and a dew point of 20° C. was supplied. Then, the film was transported into a second conditioning chamber in which the film was prevented from curling. In the second conditioning chamber, air at 90° C. and 70% humidity was directly applied to the film.

(2-7) Condition for Post-Treatment and Winding:

After dried, the polymer film was cooled to 30° C. or lower and trimmed at both edges. Trimming was as follows: Two film-trimming devices were disposed at both right and left sides of the film (that is, the number of the trimming devices was 2 on one side, and was 4 on both sides in total), and the film was trimmed with them. The trimming device comprises a disc-shaped rotary upper blade and a roll-shaped rotary lower blade, and the material of the rotary upper blade is a cemented carbide steel material. The diameter of the rotary upper blade is 200 mm, and the thickness of the blade at the cutting tip is 0.5 mm. The material of the roll-shaped rotary lower blade is a cemented carbide steel material, and the roll diameter of the rotary lower blade is 100 mm.

The surface roughness of the slit film cross section (arithmetical mean roughness, Ra) was measured and was 0.2 μm. The slit film cross section was relatively smooth and was free from saw dust. In the formation or the cellulose acylate film, the film was not cut at all during its transportation.

The surface roughness of the film cross section was measured, using a surface roughness meter (ZYGO's New View 5010) under the condition that the objective lens is 50-power and the image zoom is 1.3 times. In this case, the test condition was suitably set by the Measure Cntrl key, and the found data were processed by suitably setting the Analyze Cntrl key.

In the manner as above, a cellulose acylate film having a final product width of 1400 mm and a thickness of 40 µm was produced, and this was wound up with a winder. The dimensional change at the site of 20 mm width from the edge of the slit cellulose acylate film was determined. The dimensional change was determined as follows: The dimension (length in the cross direction) of the cellulose acylate film just after its production is first measured, then the film is kept in an environment at a temperature of 90° C. and a relative humidity of 5% for 120 hours, and its dimension (length in the cross direction) is again measured. The dimensional change (percentage) of the latter relative to the former is computed. As a result, the dimensional change at the site of 20 mm width from the edge of the cellulose acylate film was −0.15% with no problem.

The film was knurled at both edges. The knurling was given to the film by embossing it on one side, and the knurling width was 10 mm. The embossing pressure was so controlled that the largest height could be larger by 12 µm on average than the mean thickness.

With that, the film was transported into a winding chamber. The winding chamber was conditioned to have a temperature of 25° C. and a humidity of 60% inside it. Thus obtained, the width of the polymer film product was 2050 mm. The winding core diameter was 169 mm. Regarding the tension pattern, the tension at the start of the winding was 380 N/width, and was 260 N/width at the end of the winding. The overall length of the wound film was 3650 m. The oscillation cycle in winding was 400 m, and the oscillation width was ±5 mm. The pressure of the press roll to the winding roll was set at 50 N/width. The temperature of the film being wound was 25° C., the water content thereof was 0.8% by mass, and the residual solvent content thereof was 0.2% by mass. Throughout the entire process, the mean drying speed was 20% by mass (dry-base solvent)/min. The wound film was free from troubles of loosening or wrinkling, and in a 10-G impact test, it was neither loosened nor deformed. The roll appearance was good. Through the above process, polymer film samples were produced. The film sample rolls were stored on a storage rack at 25° C. and a relative humidity of 55% for 1 month, and then tested in the same manner as above; and no significant difference was recognized between them. In addition, the rolls were free from surface blocking. After the film samples were produced, the metal support, endless belt was checked, but had no cast film residue from the dope remaining thereon.

3) Heat Treatment Step:

(3-1) Preliminary Stretching:

The obtained film was monoaxially stretched in the machine direction, using a roll stretcher. The roll of the roll stretcher is an induction heater jacket roll having a mirror-polished surface; and the temperature of every roll was made controllable separately. The stretching zone was covered with a casing and kept at 160° C. The former roll in the stretching zone was so designed that the film could be gradually heated up to 160° C. The stretching distance was so designed that the aspect ratio could be 3.3; and the pulling speed was 10%/min relative to the stretching distance. The draw ratio in preliminary stretching is as in Table 1. In Table 1, the draw ratio in preliminary stretching of 0% means that the sample did not have the preliminary stretching step. The draw ratio in preliminary stretching of the film was determined as follows: Reference lines are given to the film at regular intervals in the direction perpendicular to the film-traveling direction, and the distance between them is measured before and after preliminary stretching, and the draw ratio is computed according to the following formula:

Draw Ratio in Preliminary Stretching of Film (%)=100×(reference line distance after preliminary stretching−reference line distance before preliminary stretching)/(reference line distance before preliminary stretching).

(3-2) Heat Treatment:

The preliminary-stretched film was heat treated, using a device having a heating zone between two nip rolls. The nip rolls were so controlled that the aspect ratio (roll-to-roll distance/base width) could be 3.3. The temperature in the heating zone was as in Table 1. After having passed through the two nip rolls, the film was cooled to 25° C. at a rate of 500° C./min. The film elongation was determined as follows: Reference lines are given to the film at regular intervals in the direction perpendicular to the film-traveling direction, and the distance between them is measured before and after the heat treatment, and the film elongation is computed according to the formula mentioned below. The film elongation in the heat treatment step was within a range of from 5 to 60%.

Film Elongation (%)=100×(reference line distance after heat treatment−reference line distance before heat treatment)/(reference line distance before heat treatment).

The shrinkage in the cross direction of the film in the heat treatment step, which is computed according to the formula mentioned below, was within a range of from 5 to 50%.

Shrinkage of Film in cross direction (%)=100×(overall width before heat treatment−overall width after heat treatment)/(overall width before heat treatment).

(3-3) Re-Stretching:

Optionally, the heat-treated film was then held with tenter clips at both edges thereof, and stretched in the direction perpendicular to the film-traveling direction in a heating zone. The temperature in the heating zone was 160° C., and the film was re-stretched to the draw ratio as in Table 1. The draw ratio in re-stretching of the film was determined as follows: Reference lines are given to the film at regular intervals in the direction parallel to the film-traveling direction, and the distance between them is measured before and after stretching, and the draw ratio is computed according to the following formula:

Draw Ratio in Restretching (%)=100×(reference line distance after stretching−reference line distance before stretching)/(reference line distance before stretching).

(3-4) Trimming Step:

The above heat-treated and re-stretched polymer film was cooled to 30° C. or lower, and trimmed at both edges. Trimming was as follows: Two film-trimming devices were disposed at both right and left sides of the film (that is, the number of the trimming devices was 2 on one side, and was 4 on both sides in total), and the film was trimmed with them to a trimming width of from 30 to 300 mm at both edges. The trimming device comprises a disc-shaped rotary upper blade and a roll-shaped rotary lower blade, and the material of the rotary upper blade is a cemented carbide steel material. The diameter of the rotary upper blade is 300 mm, and the thickness of the blade at the cutting tip is 0.4 mm. The material of the roll-shaped rotary lower blade is a cemented carbide steel material, and the roll diameter of the rotary lower blade is 120 mm. The heat-treated polymer film waste thus trimmed off was wound around a roller having a diameter of 100 mm and rotating in parallel to the film-transporting roller, and thus this was removed from the processed film and then handled. The condition of the trimmed edges of the polymer film varies, and the trimming width was controlled in trimming the film. Both edges of the trimmed-off strip waste and those of the trimmed polymer film were visually checked with a 5-power loupe for the presence or absence of cutting faults; and the trimmed condition was evaluated according to the following evaluation method. The samples on the rank B or higher are acceptable as commercial level.

(Evaluation of Trimmed Condition)

A: The trimming width was within 200 mm, and no cutting faults were seen at the trimmed edges of the film in observation with a 5-power loupe.

B: The trimming width was within 200 mm, and some small cutting faults were seen at the trimmed edges of the film in observation with a 5-power loupe.

C: The trimming width was 250 mm or more, and some small cutting faults were seen at the trimmed edges of the film in observation with a 5-power loupe.

D: The trimming width was 250 mm or more, and a large number of cutting faults were seen at the trimmed edges of the film in observation with a 5-power loupe.

4) Evaluation of Polymer Film:

The obtained polymer films were evaluated in point of the surface condition, the slow axis fluctuation, the haze, Re, Rth, ΔRe, ΔRth, |Rth|/Re, ΔRe/Re, ΔRth/Rth. The results are shown in Table 1.

In this, the films 101, 102 and 105 (comparative samples) had a slow axis of Re in the film-traveling direction; but the other films had a slow axis of Re in the cross direction of the film.

Regarding Re and Rth fluctuation (fluctuation of found data at 5 points), the Re fluctuation was within ±1 nm and the Rth fluctuation was within ±2 nm in all samples.

The moisture permeability, in terms of the film having a thickness of 80 μm, of the films was all within a range of from 400 to 1300 g/(m²·day); and the moisture permeability of the films before heat treatment was all within a range of from 250 to 1100 g/(m²·day).

TABLE 1

| Film No. | Remarks | Cellulose Acylate SA + SB | SB propionyl | butyryl | Plasticizer type | amount used [mas. %] | Tc [° C.] | $Tm_0$ [° C.] | Preliminary Stretching draw ratio [%] | Heat Treatment temperature [° C.] |
|---|---|---|---|---|---|---|---|---|---|---|
| 101 | comparative sample | 2.90 | 0.8 | 0 | — | — | 175 | 240 | 0 | 230 |
| 102 | comparative sample | 2.90 | 0.8 | 0 | — | — | 175 | 240 | 20 | 230 |
| 103 | comparative sample | 2.90 | 0.8 | 0 | PP-10 | 12 | 175 | 240 | 0 | 170 |
| 104 | comparative sample | 2.90 | 0.8 | 0 | PP-10 | 12 | 175 | 240 | 20 | 170 |
| 105 | comparative sample | 2.80 | 2.5 | 0 | PP-10 | 12 | 205 | 210 | 20 | 210 |
| 106 | comparative sample | 2.85 | 0 | 0 | PP-10 | 12 | 195 | 290 | 20 | 180 |
| 107 | sample of the invention | 2.90 | 0.8 | 0 | PP-10 | 12 | 175 | 240 | 0 | 230 |
| 108 | sample of the invention | 2.90 | 0.8 | 0 | PP-10 | 12 | 175 | 240 | 20 | 230 |
| 109 | sample of the invention | 2.90 | 0.8 | 0 | PP-10 | 12 | 175 | 240 | 20 | 230 |
| 110 | sample of the invention | 2.90 | 0.8 | 0 | PP-1 | 12 | 175 | 240 | 20 | 230 |
| 111 | sample of the invention | 2.90 | 0.8 | 0 | PP-16 | 15 | 175 | 240 | 20 | 230 |
| 112 | sample of the invention | 2.90 | 0.8 | 0 | PP-24 | 10 | 175 | 240 | 20 | 230 |
| 113 | sample of the invention | 2.90 | 0.8 | 0 | PP-33 | 12 | 175 | 240 | 20 | 230 |
| 114 | sample of the invention | 2.90 | 0 | 0.8 | PP-10 | 12 | 175 | 220 | 20 | 200 |
| 115 | sample of the invention | 2.90 | 0.4 | 0.4 | PP-10 | 12 | 175 | 230 | 20 | 210 |
| 116 | sample of the invention | 2.85 | 0.7 | 0 | PP-10 | 12 | 190 | 250 | 20 | 230 |
| 117 | sample of the invention | 2.80 | 0.7 | 0 | PP-10 | 12 | 205 | 230 | 20 | 210 |
| 118 | sample of the invention | 2.95 | 0.7 | 0 | PP-10 | 12 | 165 | 250 | 20 | 230 |
| 119 | sample of the invention | 2.95 | 1.2 | 0 | PP-10 | 12 | 165 | 230 | 20 | 210 |
| 120 | sample of the invention | 2.95 | 2.0 | 0 | PP-10 | 12 | 165 | 220 | 20 | 200 |
| 201 | comparative sample | 2.90 | 0.8 | 0 | KH-1 | 12 | 175 | 240 | 20 | 230 |
| 202 | comparative sample | 2.90 | 0.8 | 0 | KH-2 | 12 | 175 | 240 | 20 | 230 |
| 203 | comparative sample | 2.90 | 0.8 | 0 | KH-3 | 12 | 175 | 240 | 20 | 230 |
| 301 | sample of the invention | 2.90 | 0.8 | 0 | PP-10 | 12 | 175 | 240 | 20 | 230 |
| 401 | sample of the invention | 2.90 | 0.8 | 0 | PP-10 | 12 | 175 | 240 | 20 | 230 |

| Film No. | Re-stretching draw ratio [%] | Surface Condition | Trimmed Condition | Slow Axis Fluctuation [°] | Haze [%] | Re mean value [nm] | Rth mean value [nm] | ΔRe mean value [nm] | ΔRth mean value [nm] | \|Rth\|/Re mean value | ΔRe/Re mean value [nm] | ΔRth/Rth mean value |
|---|---|---|---|---|---|---|---|---|---|---|---|---|
| 101 | 20 | A | D | 0.1 | 0.2 | 112 | −49 | 40 | 45 | 0.44 | 0.36 | 0.92 |
| 102 | 20 | A | D | 0.1 | 0.3 | 221 | −106 | 44 | 30 | 0.48 | 0.20 | 0.28 |
| 103 | 20 | A | B | 0.3 | 0.3 | 2 | −30 | 26 | 33 | 15.00 | 13.00 | 1.10 |
| 104 | 20 | A | B | 0.3 | 0.5 | 2 | −53 | 28 | 35 | 26.50 | 14.00 | 0.66 |
| 105 | 20 | | | *As melted, the film could not be evaluated. | | | | | | | | |
| 106 | 20 | C | D | *As whitened, the film could not be evaluated. | | | | | | | | |
| 107 | 20 | A | B | 0.3 | 0.3 | 122 | −55 | 28 | 29 | 0.45 | 0.23 | 0.53 |
| 108 | 20 | A | A | 0.1 | 0.2 | 168 | −54 | 22 | 28 | 0.32 | 0.13 | 0.52 |
| 109 | 10 | A | A | 0.1 | 0.3 | 187 | −72 | 28 | 28 | 0.39 | 0.15 | 0.39 |
| 110 | 20 | A | A | 0.1 | 0.3 | 180 | −85 | 22 | 22 | 0.47 | 0.12 | 0.26 |
| 111 | 20 | A | A | 0.1 | 0.3 | 190 | −80 | 25 | 30 | 0.42 | 0.13 | 0.38 |
| 112 | 20 | A | A | 0.1 | 0.3 | 220 | −83 | 24 | 29 | 0.38 | 0.11 | 0.35 |
| 113 | 20 | A | B | 0.1 | 0.3 | 255 | −105 | 26 | 22 | 0.1 | 0.10 | 0.21 |

TABLE 1-continued

| | | | | | | | | | | | | |
|---|---|---|---|---|---|---|---|---|---|---|---|---|
| 114 | 20 | A | A | 0.2 | 0.3 | 205 | −89 | 19 | 15 | 0.43 | 0.09 | 0.17 |
| 115 | 20 | A | A | 0.2 | 0.3 | 195 | −83 | 21 | 20 | 0.43 | 0.11 | 0.24 |
| 116 | 20 | A | A | 0.1 | 0.3 | 180 | −73 | 27 | 25 | 0.41 | 0.15 | 0.34 |
| 117 | 20 | A | A | 0.1 | 0.3 | 35 | −16 | 5 | 23 | 0.46 | 0.14 | 1.44 |
| 118 | 20 | A | A | 0.1 | 0.3 | 255 | −105 | 26 | 25 | 0.41 | 0.10 | 0.24 |
| 119 | 20 | A | B | 0.1 | 0.3 | 225 | −91 | 22 | 27 | 0.40 | 0.10 | 0.30 |
| 120 | 20 | A | A | 0.2 | 0.3 | 205 | −88 | 10 | 24 | 0.43 | 0.05 | 0.27 |
| 201 | 20 | B | C | 0.40 | 0.8 | 153 | −60 | 24 | 27 | 0.39 | 0.16 | 0.45 |
| 202 | 20 | B | C | 0.50 | 0.9 | 154 | −59 | 27 | 24 | 0.38 | 0.18 | 0.41 |
| 203 | 20 | B | C | 0.50 | 0.8 | 152 | −49 | 29 | 30 | 0.32 | 0.19 | 0.61 |
| 301 | 20 | A | A | 0.1 | 0.2 | 284 | −75 | 24 | 26 | 0.26 | 0.08 | 0.35 |
| 401 | 20 | A | A | 0.1 | 0.2 | 198 | −46 | 25 | 24 | 0.23 | 0.13 | 0.52 |

As in Table 1, the plasticizer-containing films 107 to 120 of the invention (samples of the invention) were, after heat-treated at a temperature T satisfying $Tc \leqq T < Tm_0$, gave transparent polymer films having an enlarged Re and having a reduced |Rth|/Re (comparison between films 103 and 107, comparison between films 104 and 108). Further, the plasticizer-containing films of the invention have not only a reduced |Rth|/Re but also have excellent characteristics of ΔRe, ΔRth, ΔRe/Re and ΔRth/Rth, and their surface condition was good and their trimmed edges were also good. Thus produced, the transparent films of the invention satisfy all the requirements of reduced slow axis fluctuation and reduced haze (films 107 to 120). In addition, the plasticizer-containing films of the invention are free from problems of smoke emission and oily contamination during heat treatment. In particular, when the films are preliminary-stretched, they may give transparent films having a further higher Re (comparison between films 107 and 108). Further, the plasticizer-containing films of the invention are free from a trouble of film residue sticking to peeling rollers, and the producibility in film formation in the invention is good.

As opposed to these, the films 101 and 102 (comparative samples) not containing the plasticizer peculiar to the invention may have optical properties within a preferred range, but their handlability, especially their trimming capability is extremely bad, and they have a severe problem in their production. Further, the film residue remains on the edges of the peeling rollers, and this is also problematic in the film formation.

The films 103 to 106 (comparative samples) were heat-treated at a temperature not falling within the scope of the invention. They could not satisfy all the requirements of ΔRe, ΔRth, ΔRe/Re, ΔRth/Rth, the surface condition, the trimmed condition, the slow axis fluctuation and the haze, or the films themselves could not be produced. From the above, it is known that the invention has made it possible to readily produce transparent polymer films having a low |Rth|/Re, which heretofore could not be produced when a complicated process is not employed, and additionally has made it possible to greatly improve the handlability of the films in their production. In addition, it has been confirmed that the transparent polymer films of the invention obtained through heat treatment at a temperature T that satisfies $Tc \leqq T < Tm_0$ have another advantage that their moisture-dependent retardation fluctuation is reduced.

<<Films 201 to 203>>

Films 201 to 203 (comparative samples) were produced according to the same process as that for the film 108, for which, however, the plasticizer A was changed to the following plasticizer. The evaluation result of the obtained films was described in Table 1.

Film 201: Triphenyl phosphate (KH-1, molecular weight 326) as the plasticizer in an amount of 12% by mass (relative to polymer).

Film 202: Ethylphthalylethyl glycolate (KH-2, molecular weight 280) as the plasticizer in an amount of 12% by mass (relative to polymer).

Film 203: Trimethylolpropane tribenzoate (KH-3, molecular weight 446) as the plasticizer in an amount of 12% by mass (relative to polymer).

The polymer films produced by the use of these plasticizers emitted much white smoke owing to the vaporization of the plasticizer in heat treatment, and the production systems were much contaminated, and the polymer films are impracticable.

In addition, the obtained films 201-203 were trimmed poorly, and were inferior in point of the slow axis fluctuation and the haze.

<<Film 301>>

A film 301 was produced according to the same process as that for the film 108, to which, however, the following additive A was added in an amount of 0.3% by mass (relative to polymer)

Additive A:

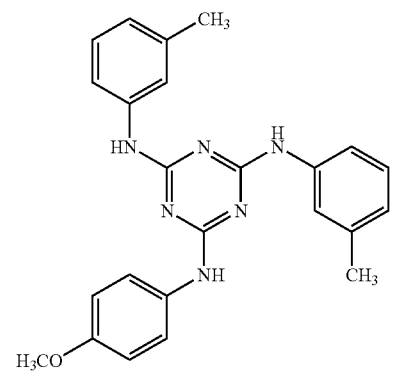 [SMILES: COc1ccc(Nc2nc(Nc3cccc(C)c3)nc(Nc3cccc(C)c3)n2)cc1]

The obtained film 301 (sample of the invention) had reduced |Rth|/Re and was excellent in the characteristics of ΔRe, ΔRth, ΔRe/Re, ΔRth/Rth; and its surface condition and its trimmed condition were both good. This was a transparent film satisfying all the requirements of reduced slow axis fluctuation and reduced haze.

<<Film 401>>

A film 401 (sample of the invention) was produced according to the same process as that for the film 108, for which, however, the polymer solution prepared in the step of "1) preparation of polymer solution" was formed into a film according to the following film formation method.

(Step of Film Formation for Film 401)

The above-mentioned polymer solution was heated at 30° C., and then cast onto a mirror-face stainless support, drum having a diameter of 3 m, through a caster, Giesser. The surface temperature of the support was set at −5° C., and the coating width was 200 cm. The space temperature in the entire casting zone was set at 15° C. At 50 cm before the end point of the casting zone, the cellulose acylate film thus cast and rolled was peeled off from the drum, and then both edges of the film were clipped with a pin tenter. Immediately after peeled, the surface temperature of the cellulose acyalte web was 5° C. The cellulose acylate web held by the pin tenter was transported into a drying zone. At first, the film was exposed to drying air applied thereto at 45° C. Next, this was dried at 110° C. for minutes and then at 140° C. for 10 minutes; and just before wound up, this was trimmed at both edges (each by 5% of the overall width), and then knurled at both edges for a width of 10 mm to a height of 50 μm, and thereafter this was wound up into a roll of 3000 m long. Thus obtained, the width of the transparent film was 1.5 m on every level and the thickness thereof was 80 μm.

The test data are shown in Table 1. Using the plasticizer of the invention, the transparent film obtained had reduced |Rth|/Re, and it had excellent characteristics of ΔRe, ΔRth, ΔRe/Re, ΔRth/Rth, its surface condition and its trimmed condition were both good, and it satisfied all the requirements of reduced slow axis fluctuation and reduced haze.

<<Film 501>>

A film 501 (sample of the invention) was produced according to the same process as that for the film 108, for which, however, the polymer film produced by heat treatment was further re-stretched according to the method mentioned below.

(Step of Re-Stretching for Film 501)

The polymer film 108 was held at both edges with tenter clips, and then stretched in a heating zone in the direction perpendicular to the film-traveling direction (film 501). The temperature in the heating zone was 160° C., in which the film was stretched by 20%. The draw ratio in stretching was determined as follows: Reference lines are given to the film at regular intervals in the direction parallel to the film-traveling direction, and the distance between them is measured before and after stretching, and the draw ratio is computed according to the following formula:

Draw Ratio in Stretching (%)=100×(reference line distance after stretching−reference line distance before stretching)/(reference line distance before stretching).

Thus re-stretched and produced, the transparent film 501 had Re of 160 and Rth of 40 and had much reduced |Rth|/Re. In addition it was excellent in the characteristics of ΔRe, ΔRth, ΔRe/Re, ΔRth/Rth, and had good surface condition and good trimmed condition, and satisfied all the requirements of reduced slow axis fluctuation and reduced haze. In particular, Rth of the film was much reduced, and it is applicable to practicable retardation films.

Example 2

Production and Evaluation of Retardation Film Laminate

The polymer film of the invention may be directly used as a retardation film as it is. In this, however, films were stuck in a mode of roll-to-roll operation to produce a retardation film having a controlled ratio of Rth/Re. A film of FUJITAC TD80UF (by FUJIFILM) and a film 108 were stuck in a roll-to-roll line, using an adhesive (comprising poly(methyl acrylate/butyl acrylate/hydroxyethyl acrylate) and toluene diisocyanate and diglycidyl ethylene glycol); and Re and Rth of the resulting laminate were measured according to the above-mentioned method. Its Re was 167 nm, and Rth was 0 nm. The retardation film had a slow axis of Re in the cross direction of the film. A film of FUJITAC TD80UF (by FUJIFILM) and two films 108 were stuck in a roll-to-roll line, using the above-mentioned adhesive, and Re and Rth of the resulting laminate were measured according to the above-mentioned method. Its Re was 240 nm and Rth was 0 nm (film 601). The retardation film had a slow axis of Re in the cross direction of the film, and had an excellent surface condition as polarizer.

Example 3

Production and Evaluation of Polarizer

1) Saponification of Film:

A film 108 was dipped in an aqueous NaOH (1.5 mol/L) solution (saponification solution) kept at 55° C. for 2 minutes, then washed with water, and thereafter dipped in an aqueous sulfuric acid (0.05 mol/L) solution 25° C., for 30 seconds, and thereafter led to pass through a water bath with running water for 30 seconds thereby neutralizing the film. Then, this was dewatered repeatedly three times with an air knife to remove water, and then kept staying in a drying zone at 70° C. for 15 seconds to be dried. The process gave a saponified film. The obtained film had an excellent surface condition, and its optical properties were almost the same as those of the original film before saponification.

2) Formation of Polarizing Film:

According to Example 1 in JP-A 2001-141926, a film was stretched in the machine direction between two pairs of nip rolls running at a different peripheral speed, thereby preparing a polarizing film having a thickness of 20 μm.

3) Lamination:

The obtained polarizing film was sandwiched between the above-mentioned two saponified films with the saponified surface of the film kept facing the polarizing film. Then, using an adhesive, aqueous 3% solution of PVA (Kuraray's PVA-117H), they were stuck together in such a manner that the polarization axis could be perpendicular to the machine direction of the film, thereby producing a polarizer.

4) Evaluation of Polarizer:

(Initial Degree of Polarization)

The degree of polarization of the polarizer was determined according to the method mentioned above. The initial degree of polarization was all 99.9%; and the polarizer had excellent polarization properties.

(Degree of Polarization 1 after Aging)

The polarizer was stuck to a glass plate with an adhesive with the saponified film surface thereof kept facing the glass plate, and left at 60° C. and 95% RH for 500 hours. After thus left, the degree of polarization (after aging) of the polarizer was computed according to the above-mentioned method. The degree of polarization 1 after aging of the polarizer was all 99.9%; and the polarizer had excellent polarization properties.

(Degree of Polarization 2 after Aging)

The polarizer was stuck to a glass plate with an adhesive with the saponified film surface thereof kept facing the glass plate, and left at 90° C. and 0% RH for 500 hours. After thus left, the degree of polarization (after aging) of the polarizer was computed according to the above-mentioned method.

The reduction in the polarization degree was at most 0.1%, and this is a level with no problem in practical use of the polarizer.

Example 4

Production and Evaluation of Liquid-Crystal Display Device

The polarizer produced in Example 3 was built in an IPS-mode liquid-crystal display device (32 V-mode high-definition liquid-crystal TV monitor, W32-L7000, by Hitachi), in place of the original polarizer therein. The viewing angle characteristics of the thus-modified device were improved. The effect was also confirmed after the liquid-crystal display device was left in a low-humidity condition (25° C., relative humidity of 10%) for 500 hours and then driven, and after it was left in a high-humidity condition (25° C., relative humidity of 80%) for 500 hours and then driven.

The invention can control the retardation expressibility of a film by a relatively easy operation. In particular, the invention may readily produce a transparent polymer film having a low |Rth|/Re (especially less than 0.5), which, however, could be produced only by a complicated conventional method. The invention is free from troubles of smoke emission and oily contamination in film formation, and may produce a film that may be trimmed easily with no problem. The transparent polymer film provided by the invention is widely applicable to optical use for retardation films, etc. In addition, since the transparent polymer film of the invention has a suitable moisture permeability, it can be stuck to a polarizing film in an on-line process, and may give polarizers of good visibility at good producibility. Further, the invention provides a liquid-crystal display device of high reliability. Accordingly, the industrial applicability of the invention is good.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 197214/2007 filed on Jul. 30, 2007, which is expressly incorporated herein by reference in its entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A method for producing a transparent polymer film, comprising heat-treating a polymer film containing a polymer and a plasticizer having a number-average molecular weight of from 500 to 10000 and having a repetitive unit, at a temperature T (unit, ° C.) satisfying the following formula (1) to obtain a film satisfying the following formula (2):

$$Tc \leq T < Tm_0 \tag{1}$$

wherein Tc means crystallization temperature (unit, ° C.) of the polymer film before heat-treatment, and $Tm_0$ means melting point (unit, ° C.) of the polymer film before heat treatment, $$|Rth|/Re < 0.5 \tag{2}$$

wherein Re means in-plane retardation (unit, nm) of the film; and Rth means thickness-direction retardation (unit, nm), and wherein the polymer is a cellulose acylate.

2. The method for producing a transparent polymer film according to claim 1, wherein the plasticizer is at least one selected from the group consisting of polyester plasticizers, polyester polyether plasticizers, polyester polyurethane plasticizers, polyacrylate plasticizers, and polymethacrylate plasticizers.

3. The method for producing a transparent polymer film according to claim 1, wherein the plasticizer is incorporated in an amount of from 2 to 30% by mass of the polymer.

4. The method for producing a transparent polymer film according to claim 1, wherein the polymer film to be heat-treated is stretched before the heat treatment.

5. The method for producing a transparent polymer film according to claim 1, wherein the polymer film is shrunk by from 5 to 80% during the heat treatment.

* * * * *